(12) United States Patent
Sato et al.

(10) Patent No.: US 6,249,324 B1
(45) Date of Patent: Jun. 19, 2001

(54) TRANSMISSION PROCESSING APPARATUS, TELEVISION CONFERENCE SYSTEM, TRANSMISSION PROCESSING METHOD AND MEMORY MEDIUM

(75) Inventors: Hiroaki Sato, Kawasaki; Tomoaki Kawai; Atsushi Kumagai, both of Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/777,409

(22) Filed: Dec. 30, 1996

(30) Foreign Application Priority Data

Jan. 8, 1996 (JP) .................................................. 8-000686
Jun. 20, 1996 (JP) .................................................. 8-159403

(51) Int. Cl.⁷ ...................................................... H04N 7/15
(52) U.S. Cl. ...................... 348/705; 348/14.08; 348/14.11
(58) Field of Search ................................. 348/705, 473, 348/484, 14, 15, 16, 385, 384, 6, 7, 12, 13; 455/4.2, 5.1, 3.04, 3.05; 725/38, 59, 64, 67, 68, 118, 98, 120, 148; H04N 7/14, 7/15, 7/16, 7/173

(56) References Cited

U.S. PATENT DOCUMENTS

| | | | |
|---|---|---|---|
| 4,961,211 | * 10/1990 | Tsugane | 348/15 |
| 5,652,630 | * 7/1997 | Bertram | 348/734 |
| 5,734,443 | * 3/1998 | O'Grady | 348/705 |
| 6,005,599 | * 12/1999 | Asai | 348/7 |
| 6,070,186 | * 5/2000 | Nishio | 348/7 |

\* cited by examiner

Primary Examiner—Sherrie Hsia
(74) Attorney, Agent, or Firm—Morgan & Finnegan, LLP

(57) ABSTRACT

There is disclosed a system capable of dispensing with the video/audio encoder in each communication terminal. A switch selects one of plural video/audio inputs. A video capture device of a transmission apparatus digitizes the selected video signal. A video encoder effects compression-encoding of the video capture device according to motion JPEG, MPEG and H.261. A selector sets compression video data to be transmitted, among the video data compressed by different encoding methods, and sends such data to a communication buffer. An audio encoder digitizes and encodes the selected audio signal and sends such signal to the communication buffer. The encoded video and audio data of the communication buffer are read to a network. A control circuit controls devices according to control commands received through the network.

29 Claims, 25 Drawing Sheets

FIG. 19

$$\left\{\begin{array}{l}\text{REQUIREMENT 1 : CAMERA 2 \quad FRAME RATE PRIORITY} \\ \text{REQUIREMENT 2 : CAMERA 4 \quad RESOLUTION PRIORITY} \\ \text{REQUIREMENT 3 : CAMERA 8 \quad FRAME RATE PRIORITY} \\ \text{REQUIREMENT 4 : CAMERA 1 \quad RESOLUTION PRIORITY} \\ \text{REQUIREMENT 5 : CAMERA 3 \quad FRAME RATE PRIORITY} \\ \text{REQUIREMENT 6 : CAMERA 5 \quad FRAME RATE PRIORITY} \\ \text{REQUIREMENT 7 : CAMERA 7 \quad FRAME RATE PRIORITY} \\ \text{REQUIREMENT 8 : CAMERA 1 \quad RESOLUTION PRIORITY}\end{array}\right.$$

FIG. 20

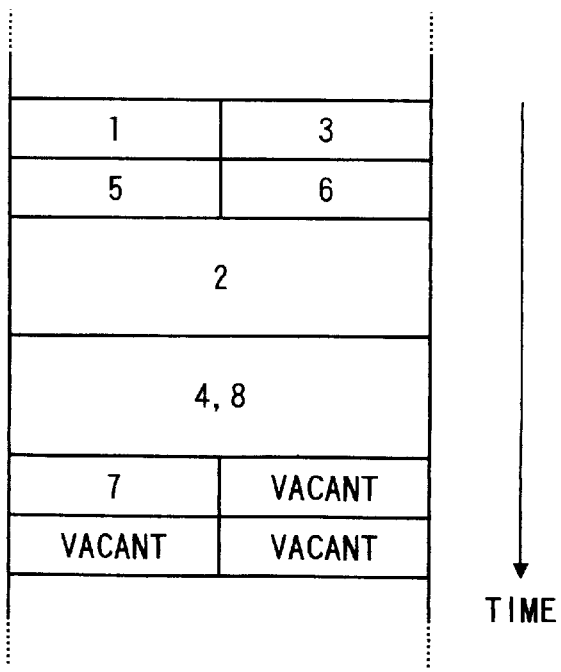

TRANSMISSION PROCESSING APPARATUS, TELEVISION CONFERENCE SYSTEM, TRANSMISSION PROCESSING METHOD AND MEMORY MEDIUM

BACKGROUND OF THE INVENTION

1. Field of the Invention

The present invention relates to a transmission processing apparatus, a television conference system, a transmission processing method and a memory medium for video/audio signals from plural video/audio sources selectively to a network, and more particularly to a transmission processing apparatus, a television conference system, a transmission processing method and a memory medium capable of adapting to a computer network.

2. Related Background Art

There is already known a configuration of the communication terminal apparatus, capable of transmitting and receiving image and voice by connecting video/audio input/output devices, such as a camera, a video monitor, a microphone, a speaker etc. to a computer (personal computer or work station), and such communication terminal apparatus is already used commonly as the terminal for television or video conference.

A video signal entered from the camera and an audio signal entered from the microphone are respectively digitized, then encoded by a predetermined method and released to a network such as a local area network or a wide area network. The encoded video and audio signals from the network are decoded, and are respectively released from the video monitor and the speaker. The microphone and the speaker are combined with an echo canceller for avoiding echo resulting from voice circulation. The microphone and the speaker may also be constructed as a speaker-phone.

Such television conference system has conventionally been constructed with communication terminals exclusively designed for this purpose, but the recent improvement in the processing ability of the computers has enabled to hold such television or video conference utilizing the ordinary desktop computers in the office.

In the application of transmitting the video/audio signals to a distant location, there is also known a tele-monitoring system for observing various distant sites.

In image transmission, there is required a high cost in the video capturing device for fetching the output image signal of the camera with digitization and a video compression device for effecting compression encoding. If such devices are provided in the computer of each participant, they are not cost-effective in consideration of the work rate of such devices.

Also in certain applications such as the tele-monitoring system, the image of a site need not necessarily be renewed with a high frame rate but can be transmitted for example with a rate of a frame per second. For such applications, the video compression device with a capacity of 30 frames per second becomes superfluous.

SUMMARY OF THE INVENTION

An object of the present invention is to resolve the above-mentioned shortcomings.

Another object of the present invention, within the above-mentioned object, is to provide a transmission processing apparatus, a television conference system, a transmission processing method and a memory medium therefor, capable of processing input signals of plural kinds.

The foregoing objects can be attained, according to the present invention, by a transmission processing apparatus for selecting a desired input from plural inputs for at least one of a video and an audio inputs and transmitting the selected input to a network, comprising: selection means for selecting plural analog input signals according to a given instruction; A/D conversion means for digitizing the analog input signal output from the selection means; encoding means for effecting compression encoding of the digital output of the A/D conversion means; and output means for outputting the encoded data from the encoding means to a network.

Still another object of the present invention is to provide a transmission apparatus and a transmission method, capable of improving the work rate of the encoding means thereby achieving effective utilization thereof.

Still another object of the present invention is to provide a transmission apparatus and a transmission method having novel functions.

Still other object of the present invention, and the features thereof, will become fully apparent from the following description of the embodiments, to be taken in conjunction with the attached drawings.

BRIEF DESCRIPTION OF THE DRAWINGS

FIG. 19 is a view showing an example of a train of transmission requests;

FIG. 20 is a view showing a transmission schedule in response to the train of transmission requests shown in FIG. 19;

DETAILED DESCRIPTION OF THE PREFERRED EMBODIMENTS

Now the present invention will be clarified in detail by preferred embodiments shown in the attached drawings.

Figure 1:
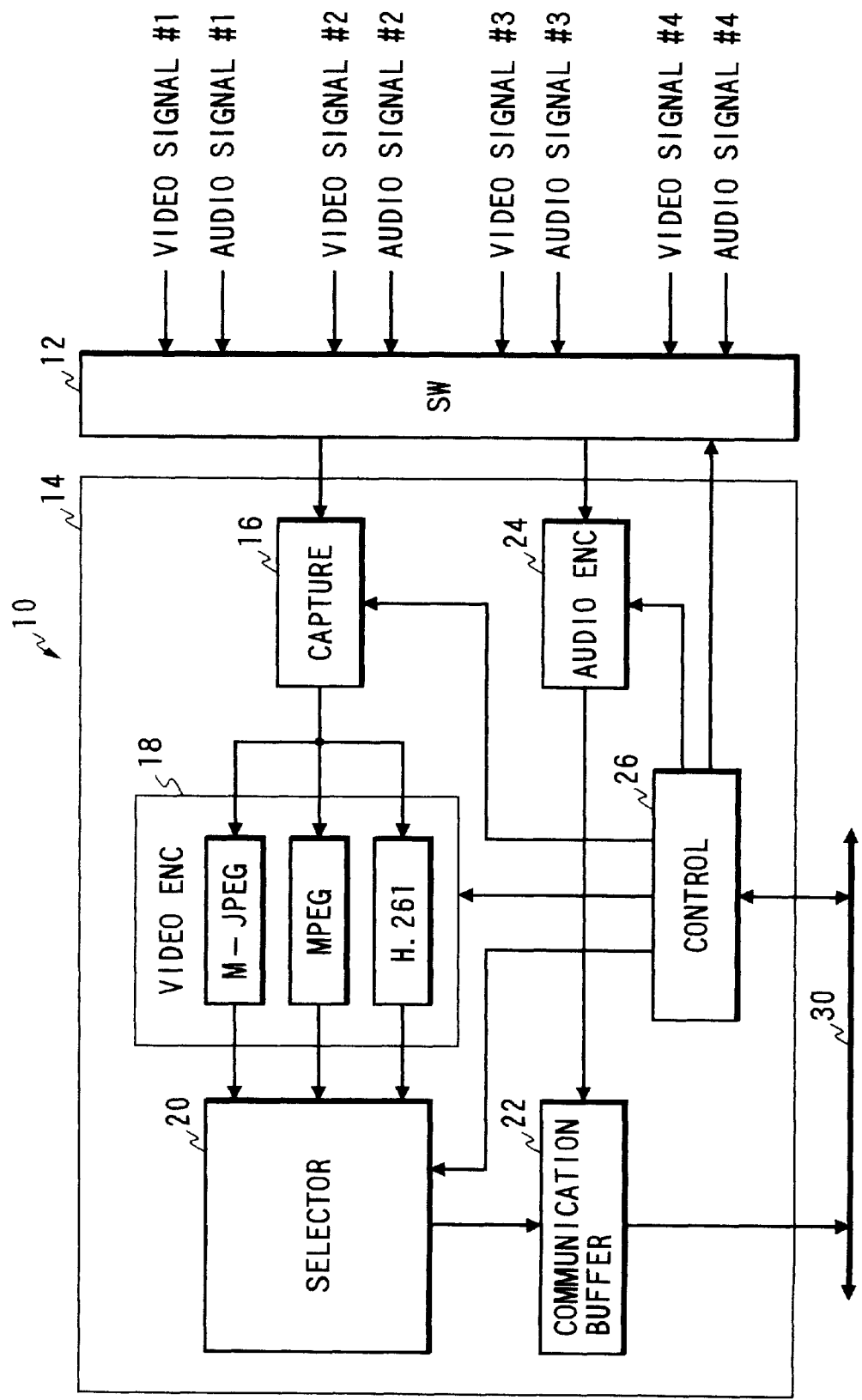
FIG. 1 is a schematic block diagram of a first embodiment of the present invention.

FIG. 1 is a schematic block diagram of a first embodiment of the present invention. A video/audio transmission processing apparatus 10 of the present embodiment is composed of a switch 12 for selecting a video/audio signal to be transmitted from plural (four in the present embodiment) video/audio inputs, and a transmission process unit 14 for effecting a transmission process of the video/audio signal selected by the switch 12.

A video capture device 16 in the transmission process unit 14 digitizes the video signal selected by the switch 12. A video encoder 18 is provided with encoding modules corresponding to the encoding methods of motion JPEG, MPEG and H.261 and effects compression encoding of the output signal of the video capture device 16 according to the motion JPEG, MPEG and H.261 encoding methods. A selector 20 selects the compressed image data to be transmitted, from the compressed image data of these encoding methods, and sends the selected data to a communication buffer 22. On the other hand, an audio encoder 24 digitizes and encodes the audio signal selected by the switch 12 and sends it to the communication buffer 22. The encoded video data and the encoded audio data, written into the communication buffer 22, are read to a network 30 with suitable format and rate.

A control circuit 26 controls the switch 12, the video capture device 16, the video encoder 18, the selector 20 and the audio encoder 24 according to control commands received through the network 30.

Figure 2:
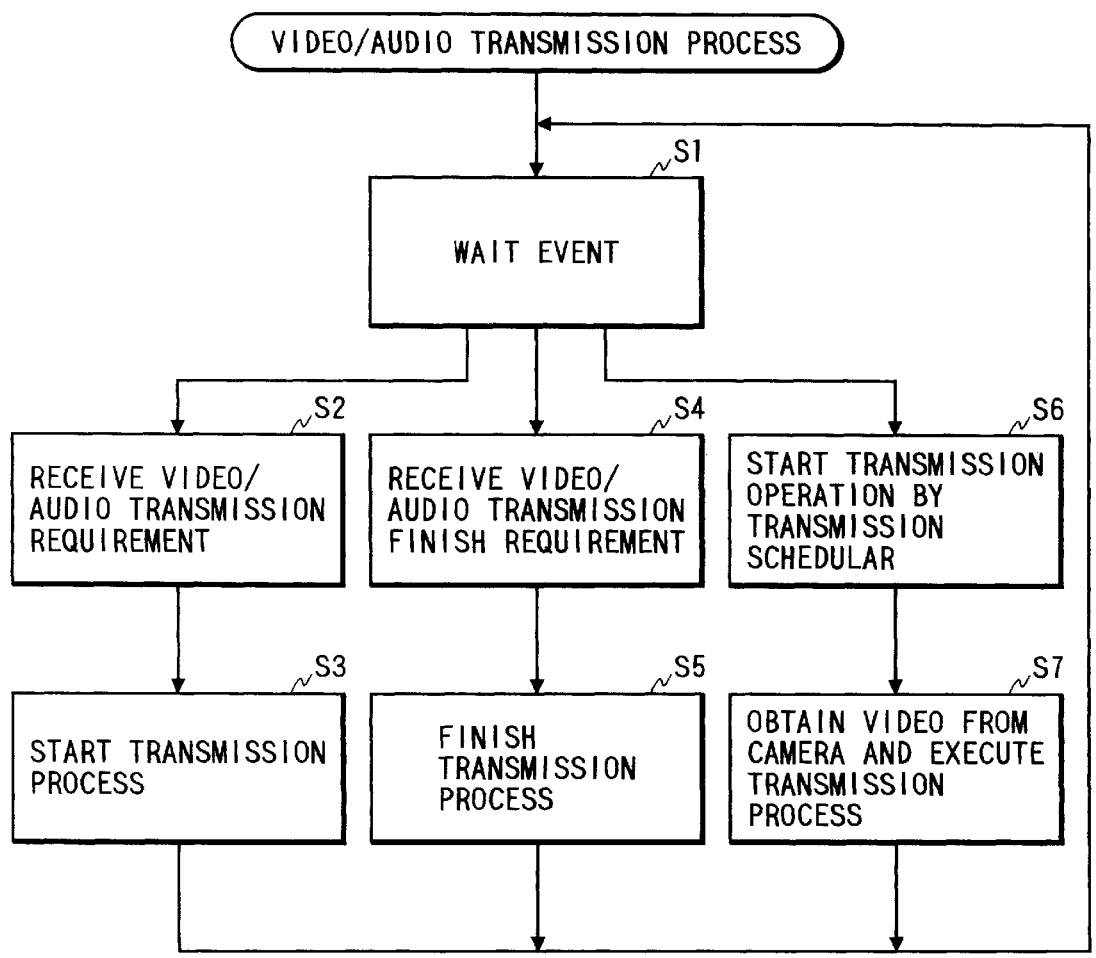
FIG. 2 is a flow chart showing the basic function of the embodiment shown in FIG. 1.

FIG. 2 is a flow chart showing the function of the embodiment shown in FIG. 1. At first there is entered a state of awaiting an event such as a transmission request, a transmission finish request or a transmission start (S1).

Upon receiving a video/audio transmission request (S2), there is initiated a new transmission process (S3). Upon receiving a video/audio transmission finish request (S4), there is finished the designated video/audio transmission process (S5). Also in case of an event for starting a video/audio transmission by a transmission scheduler (S6), there is initiated acquisition of image data from a camera and a transmission process (S7).

The present embodiment includes two kinds of transmission requests. The first one requests a video data transmission with a high frame rate, such as in a television conference. In such case, if the requested frame rate exceeds the switching speed of the switch 12 or the transmission process unit 14, all the transmitting operations have to be exclusively occupied for accommodating such request. Such request will be called an occupying process request. The second one does not require a high frame rate, as in the case of monitoring under switching of cameras. Such request will be called a non-occupying request.

There can be accepted plural non-occupying requests, and the transmission scheduler effects transmissions by sequentially selecting the signals from the designated video/audio sources. The transmission scheduler is in practice realizes by a timer event.

The control circuit 26 at enters an event awaiting state (S1). Then, in response to a communication message from the exterior or a timer event of the transmission scheduler, the sequence proceeds to a step S2, S4 or S6 according to the content of the communication message or the kind of the event.

If the communicated message is a new transmission request, the sequence proceeds to a video/audio transmission request accepting process (S2) to read the content of the message. Then a transmission starting process (S3) is executed according to the content of the message.

If the communicated message is a transmission finishing request, the sequence proceeds to a video/audio transmission finishing request accepting process (S4) to read the content of the message. Then a transmission finishing process (S5) is executed according to the content of the message.

In case a timer event is generated, the transmission process is re-started and the sequence returns to the event awaiting state (S1). The started transmission process executes acquisition of image data from the camera and transmission of the data and sets a timer (S7).

Figure 3:
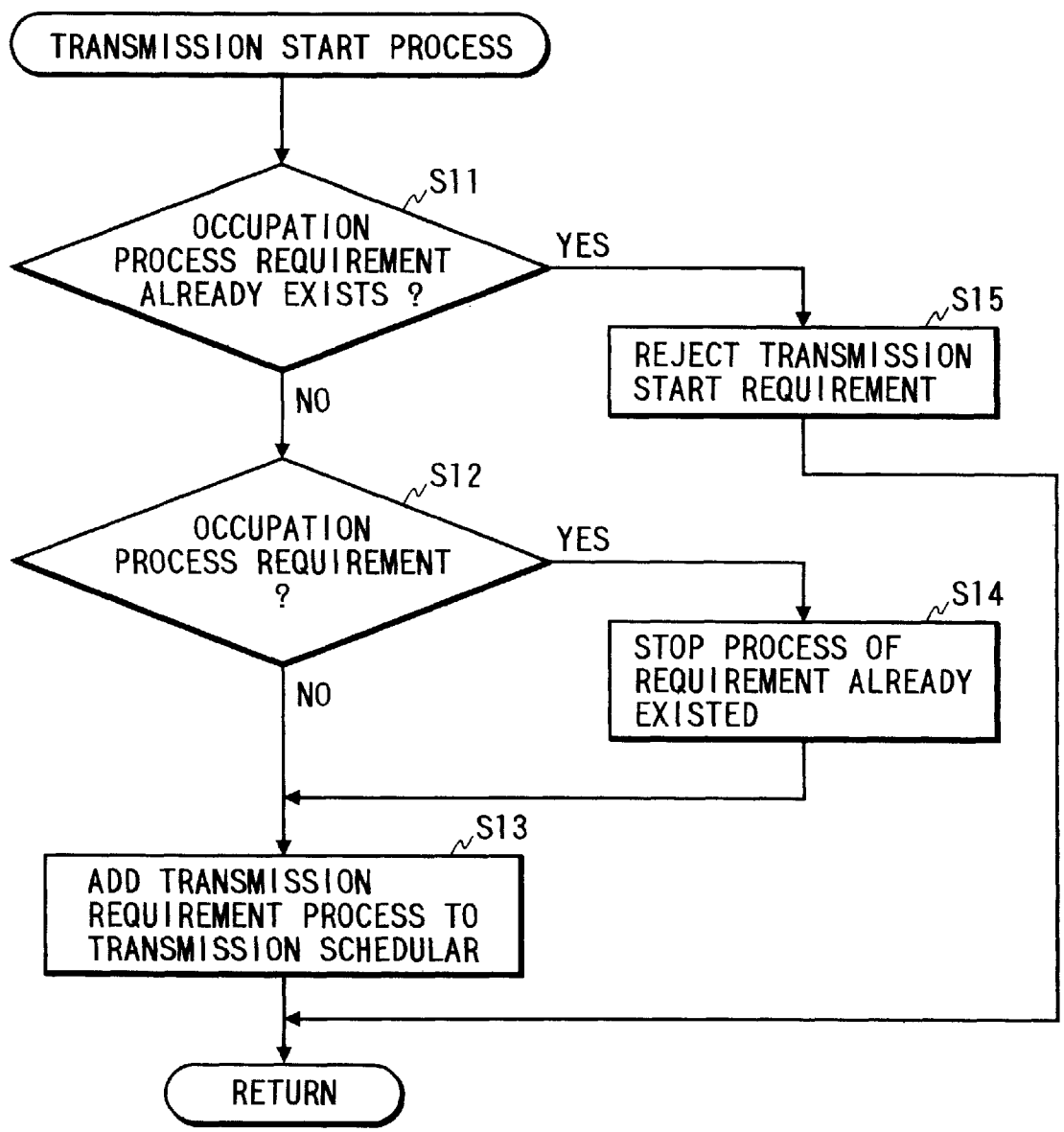
FIG. 3 is a detailed flow chart of a step S3 in FIG. 2.

FIG. 3 is a detailed flow chart of the transmission start process (S3) in FIG. 2. The control circuit 26 at first discriminates whether an occupying process request already exists (S11). If present (S11), the start request is inhibited since other requests cannot be accepted (S15). If the occupying process request does not exist (S11), there is discriminated whether the process to be started is an occupying process request (S12). If it is a non-occupying process request (S12), a transmission request process is added to the transmission scheduler and a timer for start is set (S13) whereupon the process is terminated. In case of an occupying process request (S12), which is not compatible with other requests, the process of the already existing requests is temporarily interrupted (S14). Then a transmission request process is added to the transmission scheduler and a timer for start is set (S13) whereupon the process is terminated.

Figure 4:
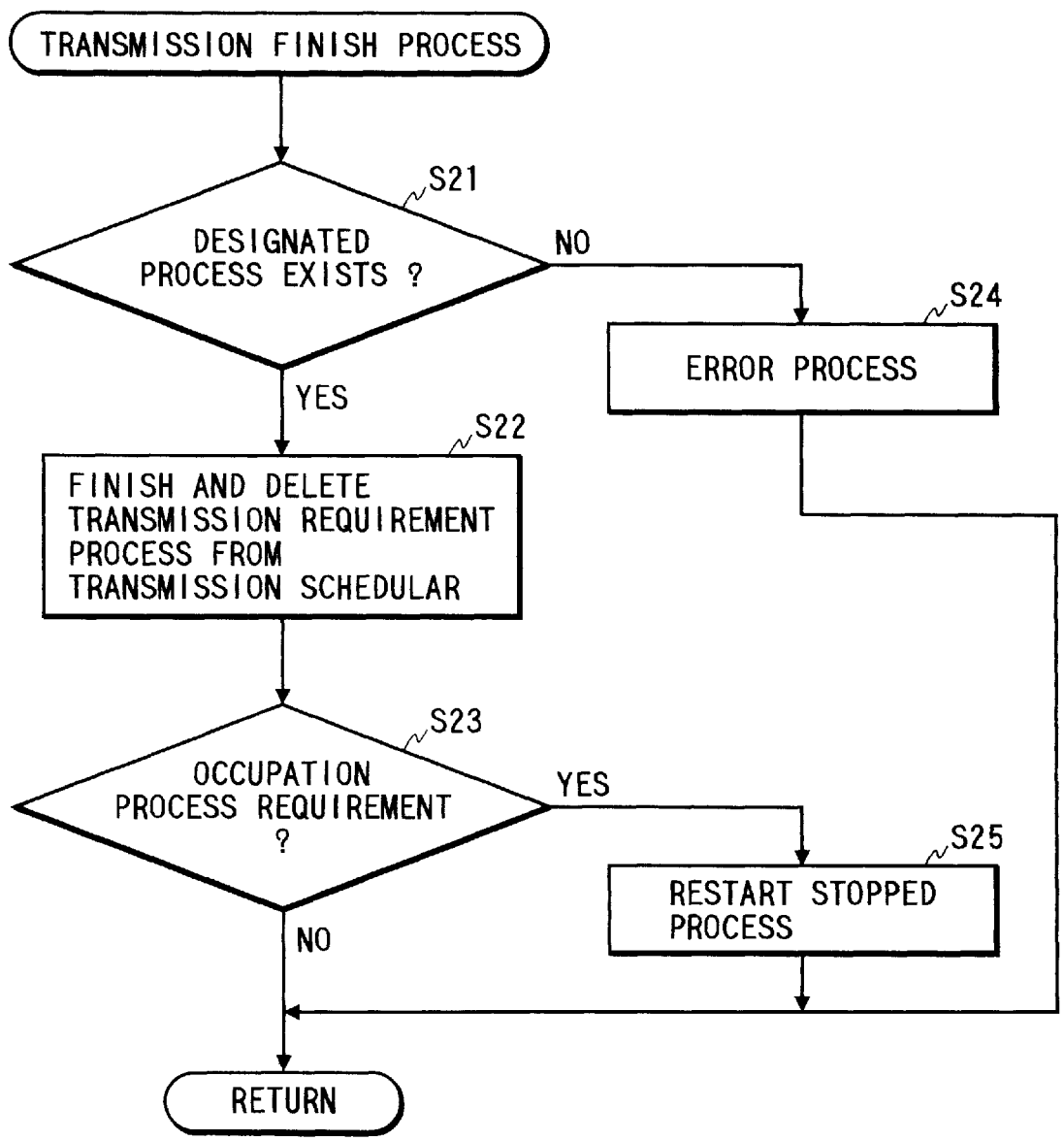
FIG. 4 is a detailed flow chart of a step S5 in FIG. 2.

FIG. 4 is a detailed flow chart of a transmission finishing process (S5) in FIG. 2. At first the control circuit 26 discriminates whether the designated process to be finished actually exists, by referring to the transmission scheduler (S21). If absent (S21), an error message is returned. If the designated process to be finished actually exists (S21), a finish signal is sent to the corresponding transmission request process, thereby deleting such process from the transmission scheduler (S22). Then there is discriminated whether the finished process is based on an occupying process request (S23), and, if so (S23), the processes temporarily suspended by such occupying process are returned to a re-startable state by referring to the transmission scheduler and the process is terminated (S25).

Figure 5:
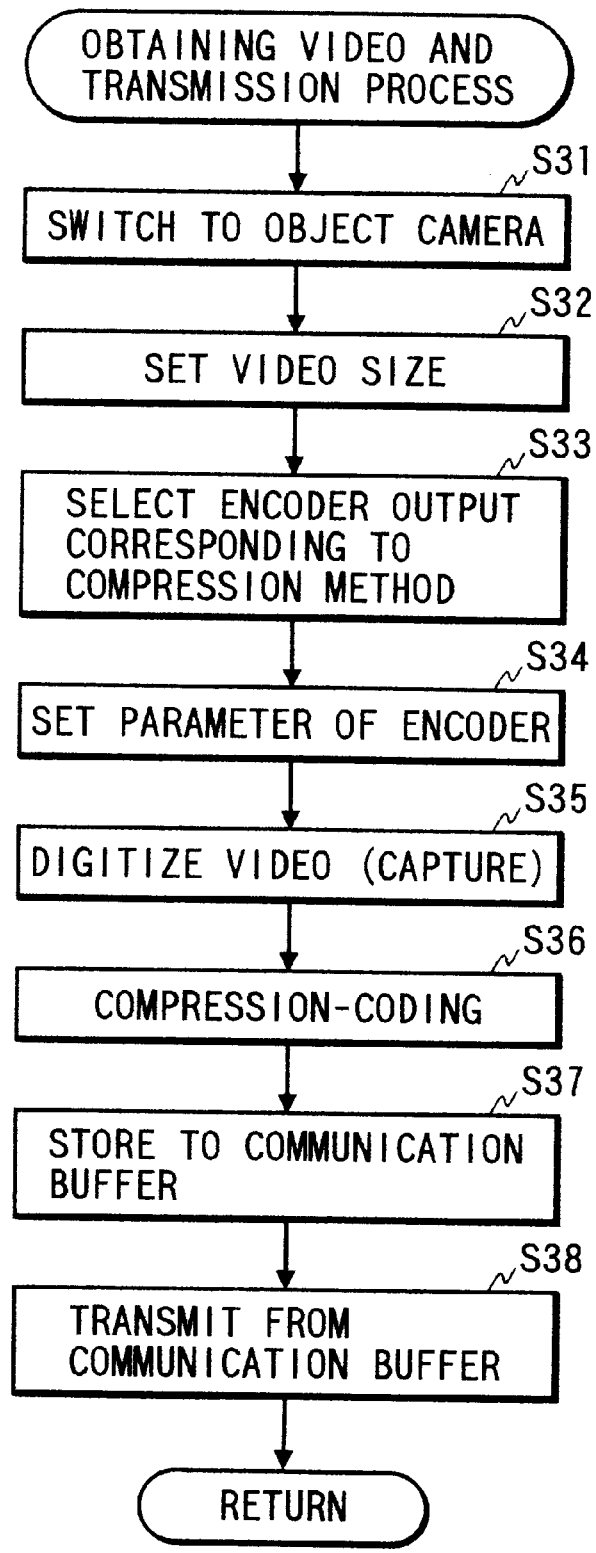
FIG. 5 is a flow chart of a transmission process in response to a non-occupying process request.

The content of the acquisition of the image data from the camera and of the transmission process (S7) varies depending on whether the process request is an occupying process request. FIG. 5 shows the details of the step S7 in FIG. 2, showing the process flow in response to a non-occupying process request. At first the control circuit so sets the switch 12 as to enter the image of the selected camera (S31), then sets the video capture device 16 at the requested image size (S32), also sets the selector 20 so as to select the encoded data corresponding to the requested compression method, among the three outputs of the video encoder 18 (S33) and sets the encoding parameters of the video encoder 18 (S34).

Subsequently the image is fetched from the camera and the corresponding data are transmitted. More specifically, the video capture device 16 digitizes the video signal from the switch 12 (S35), and the video encoder 18 effects compression encoding of the digitized video signal (S36). Then encoded video data of the designated encoding method are selected by the selector 20 and stored in the communication buffer 22 (S37). At the same time the audio encoder 24 digitizes and encodes the selected audio signal and stores it in the communication buffer 22. The encoded video and audio data stored in the communication buffer 22 are read to the network 30 with suitable rate and format, and are transmitted to the requesting terminal (or designated destination) (S38). After the transmission, the timer is set at the timing of next transmission, and the sequence is terminated.

In the present embodiment, the encoding process is executed in all the three encoding modules of the video encoder 18, but it is also possible to activate only one module corresponding to the selected encoding method.

Figure 6:
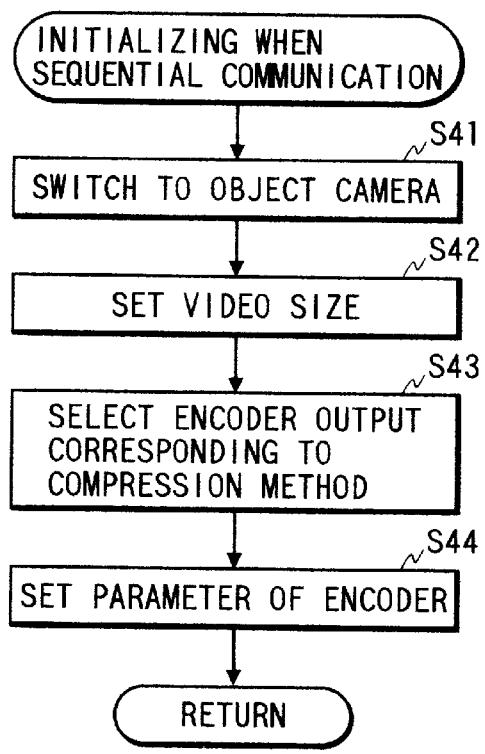
FIG. 6 is a flow chart of an initialization process for a transmission process in response to a non-occupying process request.
Figure 7:
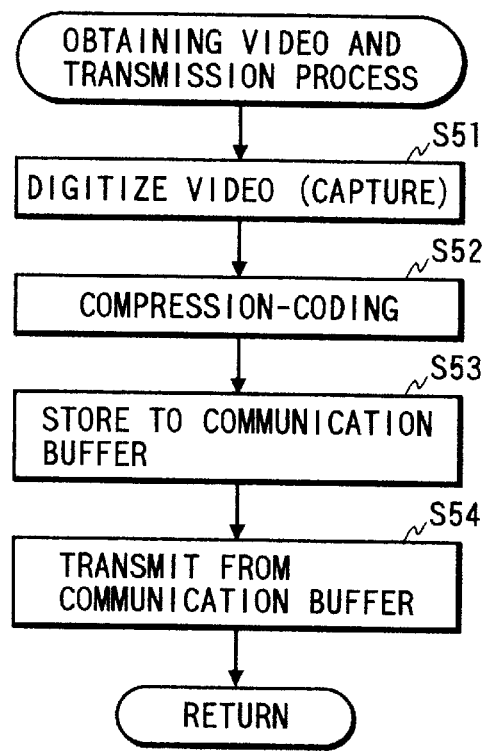
FIG. 7 is a flow chart of a data transmission process in response to an occupying process request.

FIGS. 6 and 7 show the details of the process flow of the step S7 in FIG. 2, in case of an occupying process request. FIG. 6 shows an initialization process, while FIG. 7 shows the process of acquisition of the video data from the camera and of transmission. In case of the occupying process request, an initialization process corresponding to steps S31–S34 for the non-occupying process request is executed only at first (and at the change of the transmission request parameters), and the data acquisition and the transmitting operation alone are repeated thereafter.

In the initialization process, as shown in FIG. 6, the control circuit 26 at first so sets the switch 12 as to enter the image of the requested camera (S41), then sets the video capture device 16 at the requested image size (S42), also sets the selector 20 so as to select the encoded data corresponding to the requested compression method, among the three outputs of the video encoder 18 (S43) and sets the encoding parameters of the video encoder 18 (S44). These steps are same as those S31–S34 shown in FIG. 5.

After such initialization process, there are actually repeated the acquisition of the camera image and the transmission process. More specifically, the video capture device 16 digitizes the video signal from the switch 12 (S51), and the video encoder 18 effects compression encoding of the digitized video signal (S52). Then the encoded video data of the designated encoding method are selected by the selector 20 and stored in the communication buffer 22 (S53). At the same time the audio encoder 24 digitizes and encodes the selected audio signal and stores it in the communication buffer 22. The encoded video and audio data stored in the communication buffer 22 are read to the network 30 with suitable rate and format, and are transmitted to the requesting terminal (or designated destination) (S54). After the transmission, the timer is set at the timing of next transmission, and the sequence is terminated.

The foregoing explanation has explained a case of transmitting the input signal from a camera of a microphone to a destination, but it will be apparent from the network technology, that, in case of plural requests from plural terminals for the transmission of the input signal from a camera or a microphone, such input signal can be collectively transmitted to the plural destinations.

In case there is requested a change in the parameters such as the size or the rate of the transmission data, the sequence shown in FIG. 7 is executed after the initialization shown in FIG. 6 is executed again. In such operation, if an occupying process request becomes a non-occupying process request by the change of parameters, the suspended processes are shifted to a re-startable state.

It is also possible to improve the efficiency of data transmission by forming the steps of encoding of the video/audio data and storage in the communication buffer 22 (S31–S37 in FIG. 5 and S51–S53 in FIG. 7) and the steps of transmission of the data stored in the communication buffer 22 (S38 in FIG. 5 and S54 in FIG. 7) into separate processes (namely encoding/storing process and transmission process), and preparing two buffers whereby the transmission process executing the step S38 or S54 releases the data of a buffer to the network while the encoding/storing process stores the data, to be transmitted next, in the other buffer. Such technology itself is already known as the parallel processing technology.

Figure 8:
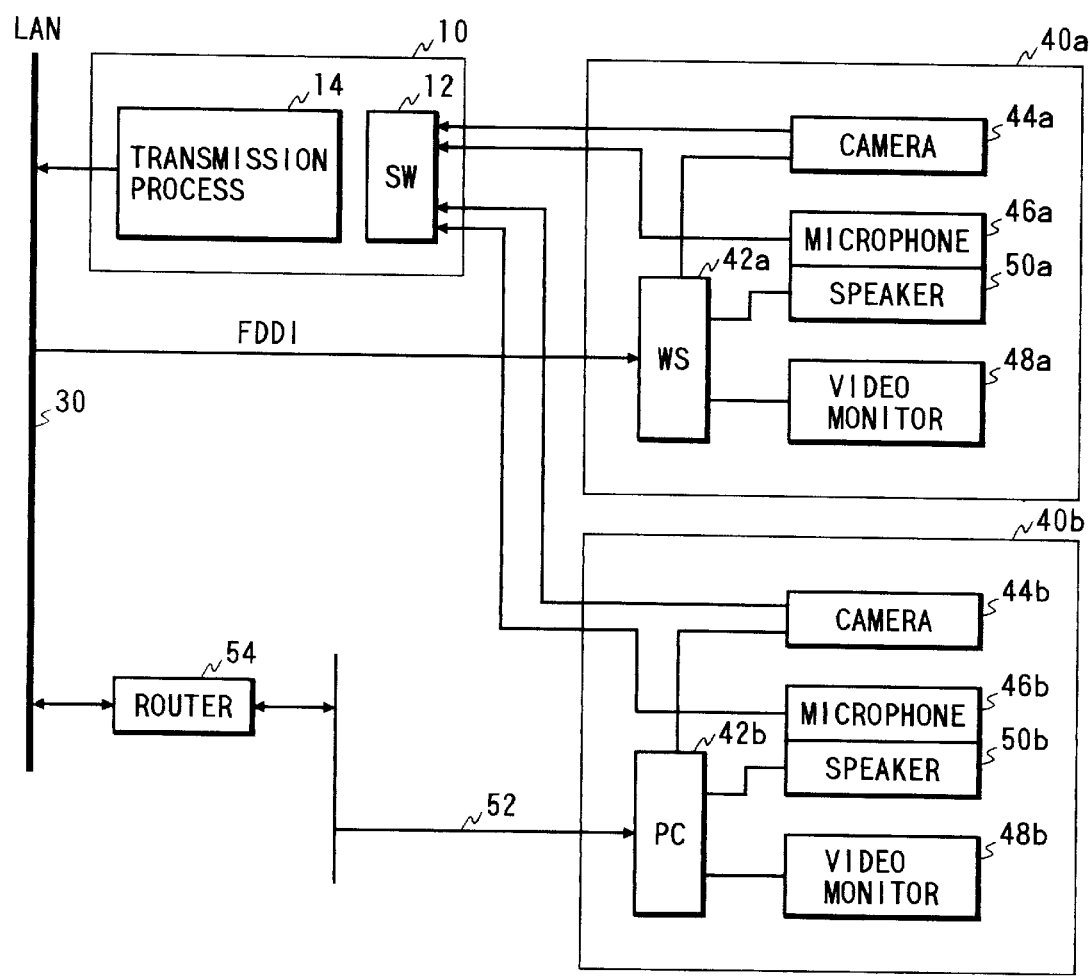
FIG. 8 is a schematic block diagram of a television conference system incorporating the embodiment shown in FIG. 1.

FIG. 8 is a schematic view showing the network configuration of a television conference system utilizing the embodiment shown in FIG. 1. The switch 12 of the video transmission apparatus 10 shown in FIG. 1 receives camera outputs and microphone outputs of two terminals 40a, 40b. The terminal 40a is constructed on a work station 42a while the terminal 40b is constructed on a personal computer 42b, and are respectively connected to cameras 44a, 44b, microphones 46a, 46b, video monitors 48a, 48b and speakers 50a, 50b. The microphones 46a, 46b and speakers 50a, 50b are for example constructed as speaker-phones.

As an example the terminal 40a is connected to the network 30 through a high-speed network such as FDDI, and the work station 42a is for example equipped with a hardware for decoding the encoded video/audio signals. The terminal 40b is connected to the network 30 through an ethernet 52 and a router 54, and the computer 42b is provided with a software for decoding the encoded video/audio signals. The network 30 to which the output of the video transmission apparatus 10 is connected is a basic network or a similar high-speed network.

In the following there will be explained how the television conference is conducted under the above-explained environment. It is assumed that the television conference is conducted between the terminal 40a and another unrepresented terminal.

In the television conference, the image of the participant himself and that of the communication partner (or plural partners) are displayed on the monitor, and the voice of the partner is released from the speaker of the terminal of the participant. In case the terminal 40a is used as the participant's terminal (self side), the above-mentioned functions can be achieved by activating the video reception process of the self terminal and activating the video and audio reception processes of the partner terminal.

Since the video reception process of the self terminal and the video and audio reception processes of the partner terminal are mutually similar, there will be explained, as an example, the video and audio reception processes of the partner terminal in the following.

Figure 9:
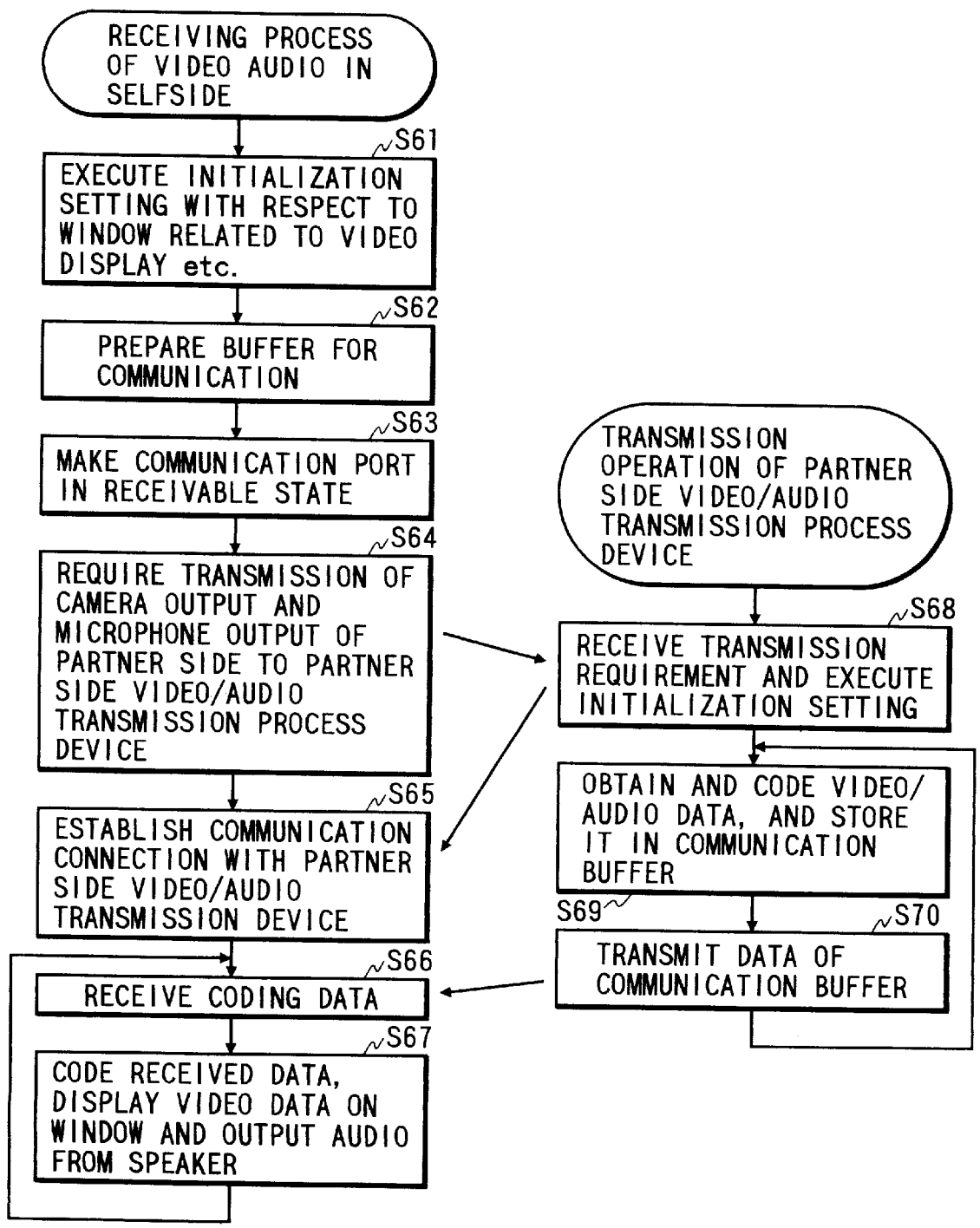
FIG. 9 is a flow chart of a video/audio transmission process of a partner video/audio transmission process apparatus and a video/audio reception process of a terminal of the self side.

FIG. 9 shows the relationship of the video/audio reception process functioning on the self terminal and the data transmission process of the video/audio transmission apparatus receiving the camera output and the microphone output of the partner side (hereinafter called partner video/audio transmission apparatus), wherein steps S61–S67 indicate the video/audio reception process functioning on the self terminal, and steps S68–S70 indicate the data transmission process of the partner video/audio transmission apparatus.

At first the reception process is activated on the self terminal. There are initialized modules on a window system required for the video display and the audio output (S61), and there is prepared a buffer for data reception (S62). Then opened is a port for reception, thereby enabling the acceptance of reception (S63). Then requested, to the partner video/audio transmission apparatus, is the transmission of the camera output and the microphone output of the partner terminal (S64). In response to this request, the partner video/audio transmission apparatus, if capable of accepting the request, executes initialization for the transmission and requests the communication connection to the reception port of the terminal 40a (S68). Thus the self terminal (40a) establishes the communication connection with the partner video/audio transmission apparatus (S65).

The partner video/audio transmission apparatus acquires and encodes the audio and video data, stores them in the communication buffer (S69) and transmits the data, stored in the communication buffer, to the communication partner (terminal 40a) (S70).

The self terminal 40a receives the encoded data (S66), then decodes the encoded data to display an image in a window of the video monitor 48a and releases a voice from the speaker 50a (S67).

Thereafter the partner video/audio transmission apparatus repeats the steps S69 and S70, while the terminal 40a repeats the steps S66 and S67. Thus the image and the voice are continuously transferred and reproduced.

The outputs of the camera and the microphone may be branched in the stage of analog signals and are supplied both to the computers 42a, 42b and to the video/audio transmission apparatus 10. In such case it is no longer necessary to receive the image of the self side, but a video capturing function for digitizing the output from the camera has to be provided in the computers 42a, 42b.

Also the wirings can be dispensed with by wireless transmission of the outputs of the cameras 44a, 44b and the microphones 46a, 46b to the video/audio transmission apparatus 10.

In this manner there can be inexpensively realized an environment for transmitting the video/audio information of plural cameras and microphones. Also the video/audio data can be transmitted and received with different compression encoding methods and with suitable transmission parameters, according to the performance or function of the receiving terminal.

Figure 10:
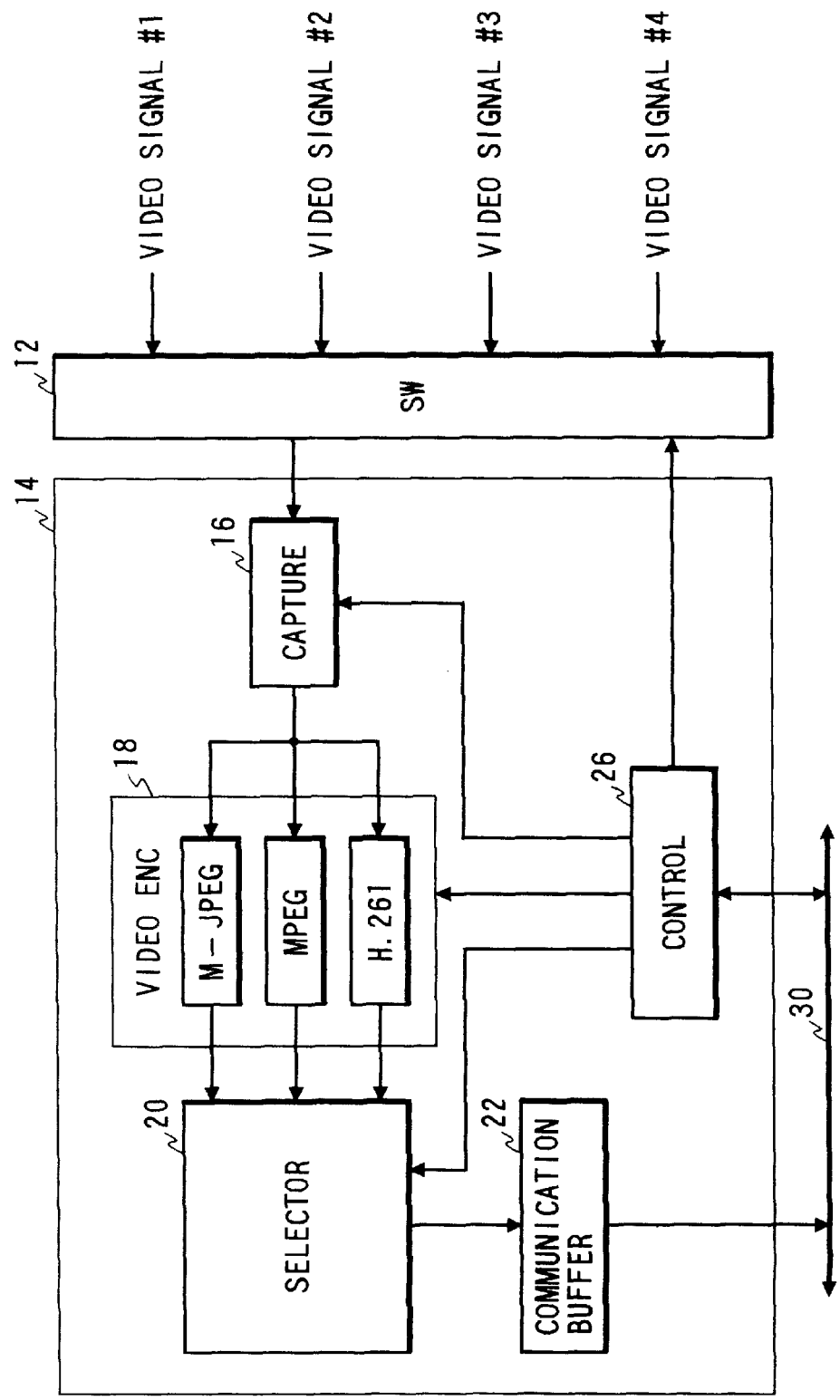
FIG. 10 is a schematic block diagram of a second embodiment of the present invention.
Figure 11:
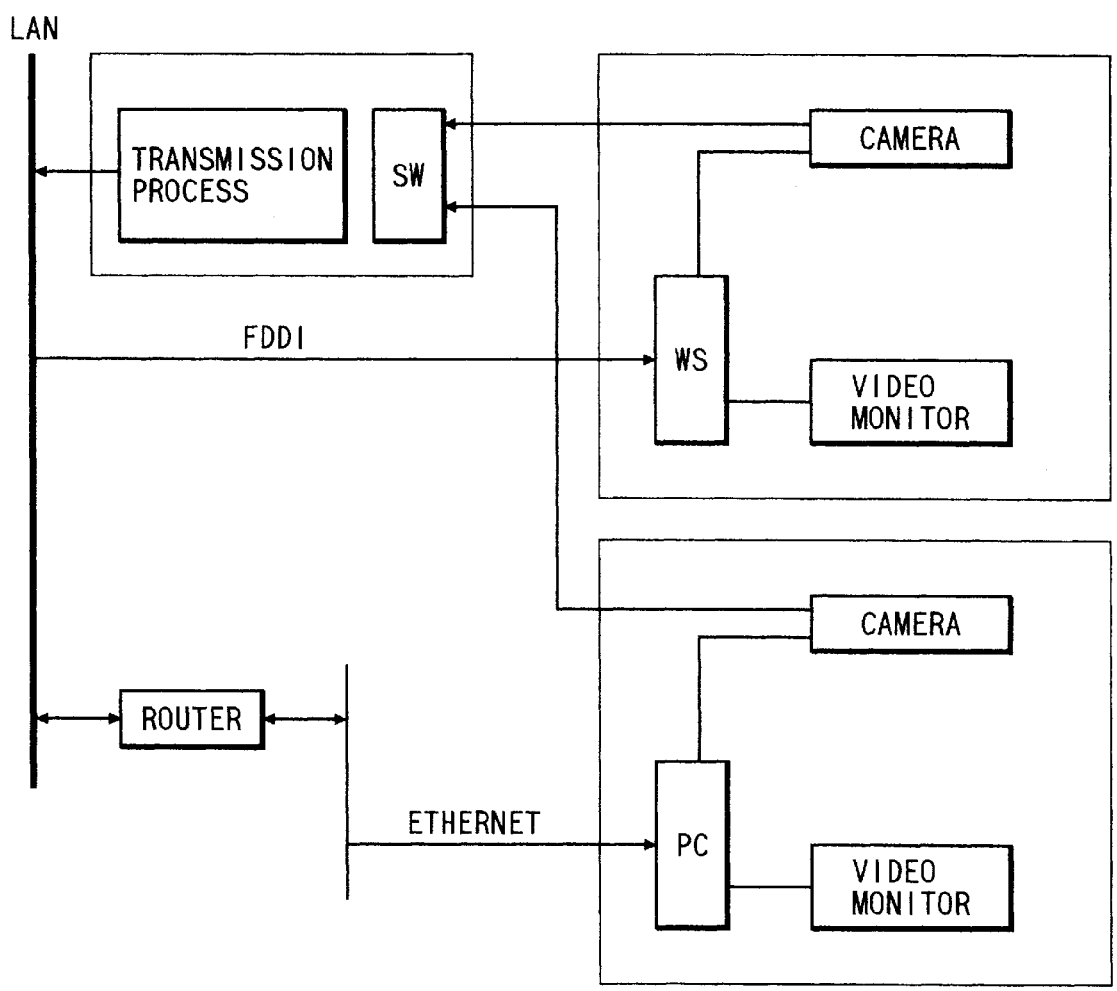
FIG. 11 is a schematic block diagram of a tele-monitoring system incorporating the embodiment shown in FIG. 10.

It is also possible to transmit the video signal only, omitting the process for the audio signal. FIG. 10 is a schematic block diagram of a video transmission apparatus, without the process for the audio signal. This configuration is different from the embodiment shown in FIG. 1 in the absence of the audio input in the switch 12 and of the audio decoder 24 in the transmission apparatus 14. The audio information is unnecessary in certain applications such as monitoring by the image, and the configuration shown in FIG. 10 achieves improved cost-effectiveness. FIG. 11 shows an example of tele-monitoring system employing the video transmission apparatus shown in FIG. 10, wherein the audio input/output devices are eliminated from the configuration shown in FIG. 8.

Such configuration allows to provide a system optimum for certain applications such as monitoring in less expensive manner.

Figure 12:
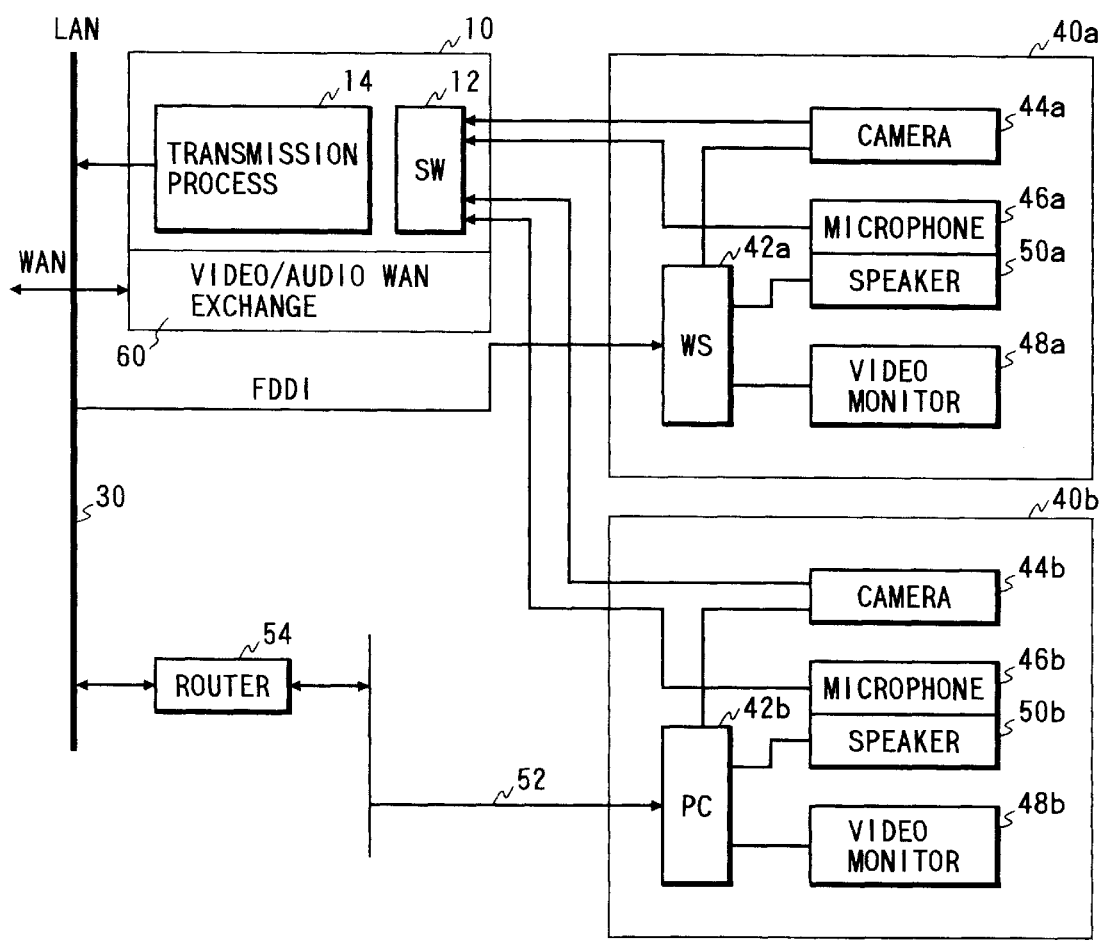
FIG. 12 is a schematic block diagram of a variation of the system shown in FIG. 8.

The configuration shown in FIG. 8 may be expanded to a wide area network (WAN) by combining a video/audio WAN exchange 60, generally called a video gateway, as shown in FIG. 12.

Such configuration enables data exchange with an external network through a public communication network such as ISDN.

The above-explained embodiment employs a video capture device for fetching the video signal and an audio encoder for plural inputs, in order to reduce the cost of such video capture device and audio encoder, but plural signals cannot be handled simultaneously in the applications requiring a high frame rate, since the switch 12 is generally not of a very high speed in consideration of the cost and size thereof.

Figure 13:
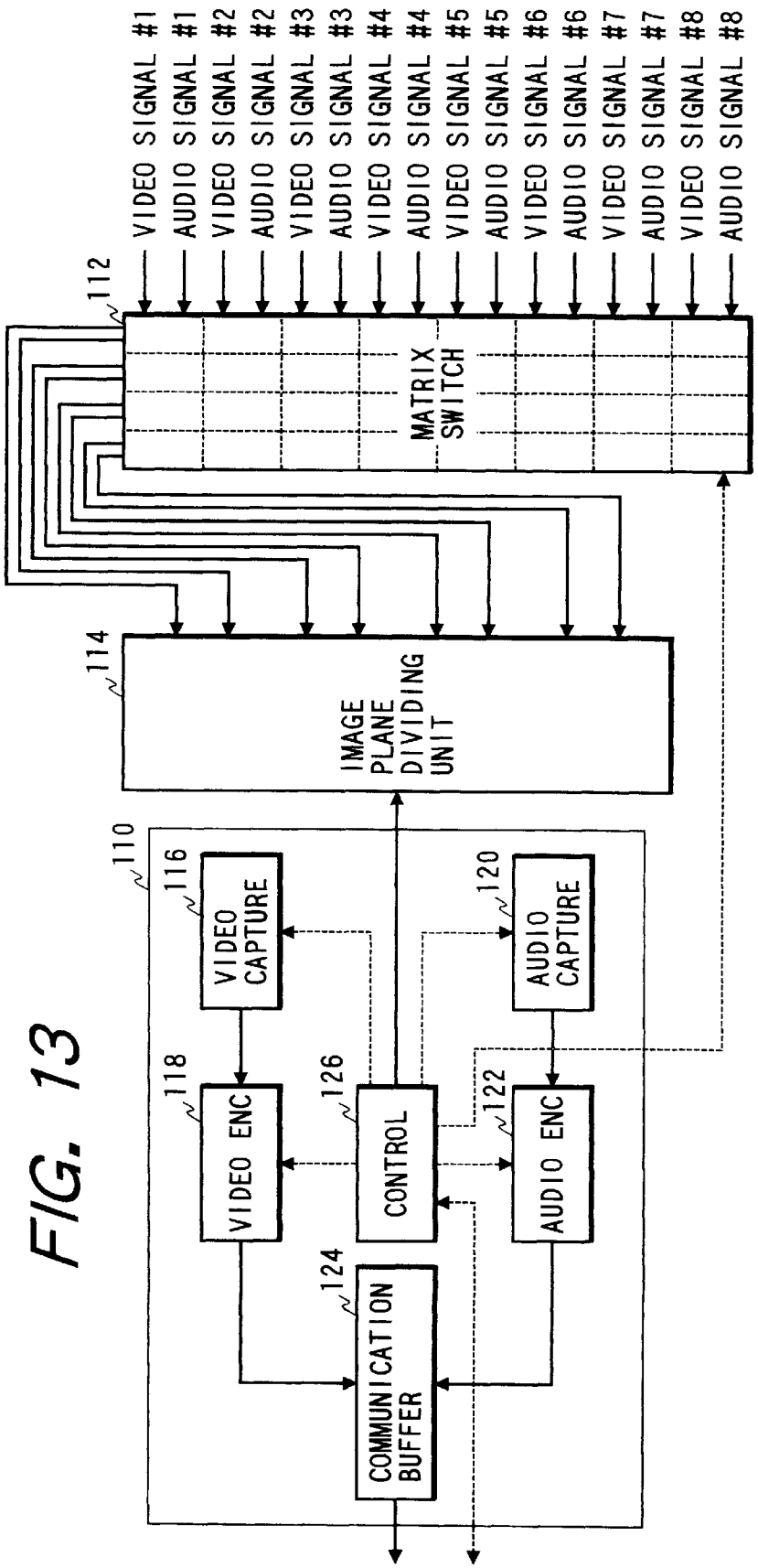
FIG. 13 is a block diagram showing a first embodiment of the present invention utilizing a matrix switch.

In the following there will be explained another embodiment capable of avoiding such limitation. FIG. 13 is a schematic block diagram of a third embodiment of the present invention, wherein shown are a video/audio transmission server 110; a matrix switch 112 capable of arbitrarily selecting four video/audio signals from eight video/audio inputs and releasing the selected ones from four video/audio output ports; and an image range dividing unit 114 for either selecting one of the four video/audio signals from the matrix switch 112 or time-axis compressing the four video/audio signals, thereby synthesizing the four video signals into a multiple image containing four images and also synthesizing the audio signals by a ¼ compression in the time axis.

A video/audio transmission server 110 is composed of a video capture device 116 for fetching and digitizing the video signal released from the image range dividing unit 114; a video encoder 118 for compression encoding the output video data from the video capture device 116; an audio capture device 120 for fetching and digitizing the audio signal released from the image range dividing unit 114; an audio encoder 122 for compression encoding the output audio data from the audio capture device 120; a communication buffer 124 for temporarily storing the encoded data from the encoders 118, 122 and the information to be transmitted; and a control circuit 126 for controlling the entire video/audio transmission server 110, the matrix switch 112 and the image range dividing unit 114.

Figure 14A:
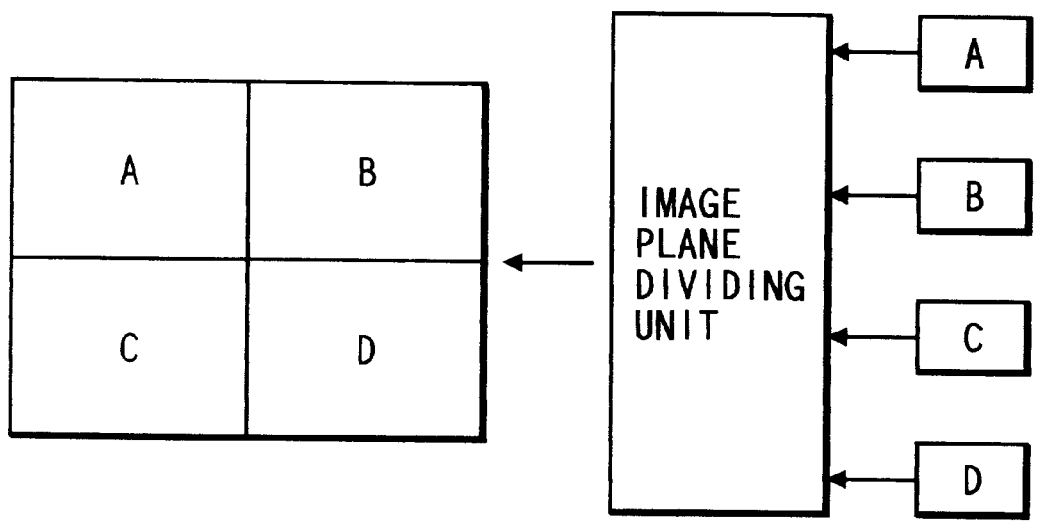
FIGS. 14A and 14B are views showing operation modes of an image area dividing unit 114.
Figure 14B:
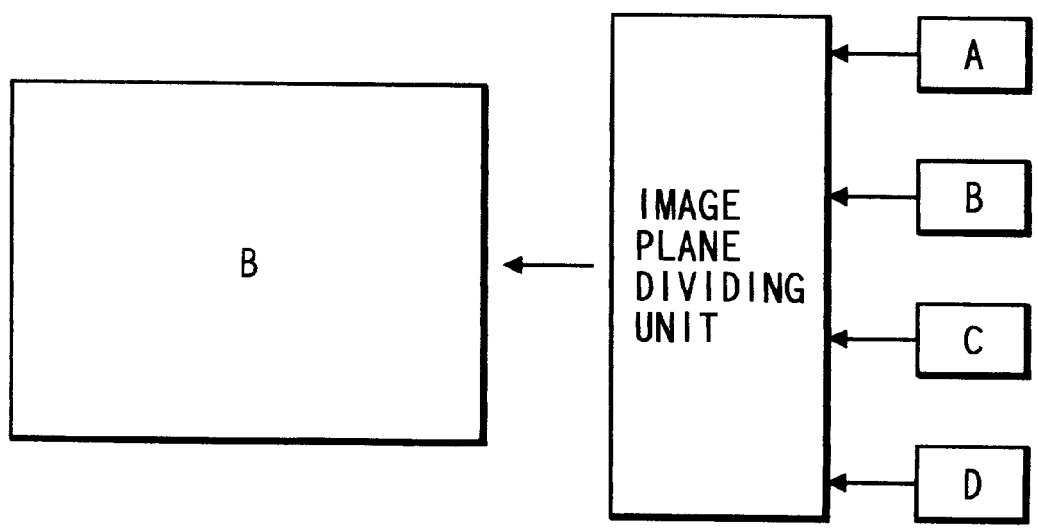

As shown in FIGS. 14A and 14B, the image range dividing unit 114 is provided with a dividing mode (shown in FIG. 14A) and a selecting mode (shown in FIG. 14B). The dividing mode is to synthesize four input images into an image by size reduction by ½ in the horizontal and vertical directions. In this mode, the image range dividing unit 114 releases the four input audio signals in synthesized state with compression in the time axis. The selecting mode selects and releases arbitrary one of the four video/audio input signals. Such functions can be realized, for example, by an equipment YS-Q430 supplied by Sony Corp.

Figure 15:
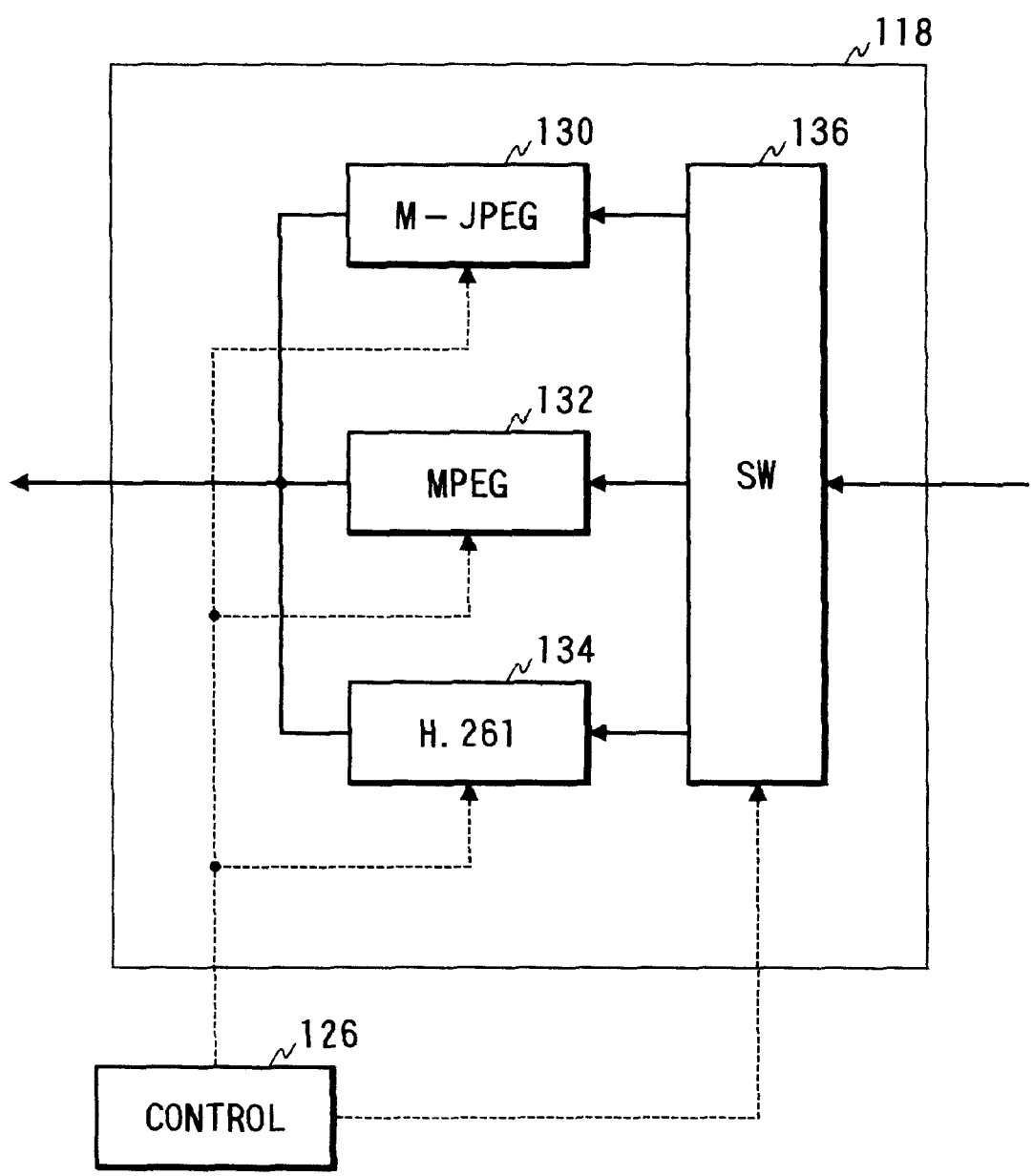
FIG. 15 is a schematic block diagram showing an example of the configuration of an image encoder 118.

The encoder 118 may be provided, for example as shown in FIG. 15, with plural encoders 130, 132, 134 corresponding to respectively different compression encoding methods (for example Motion JPEG, MPEG and ITU-T recommendation H.261) and so constructed that the input video data are supplied by a switch 136 to designated one of the encoders 130, 132, 134 under the control of the control circuit 126. The audio encoder may also be constructed in a similar manner.

The control circuit 126 sets the matrix switch 112 and the image range dividing unit 114 according to the content of the transmission request from the exterior, and also controls the video capture device 116, the video encoder 118, the audio capture device 120 and the audio encoder 122 to generate appropriate transmission data and to transmit such data to the external network through the communication buffer 124.

Figure 16:
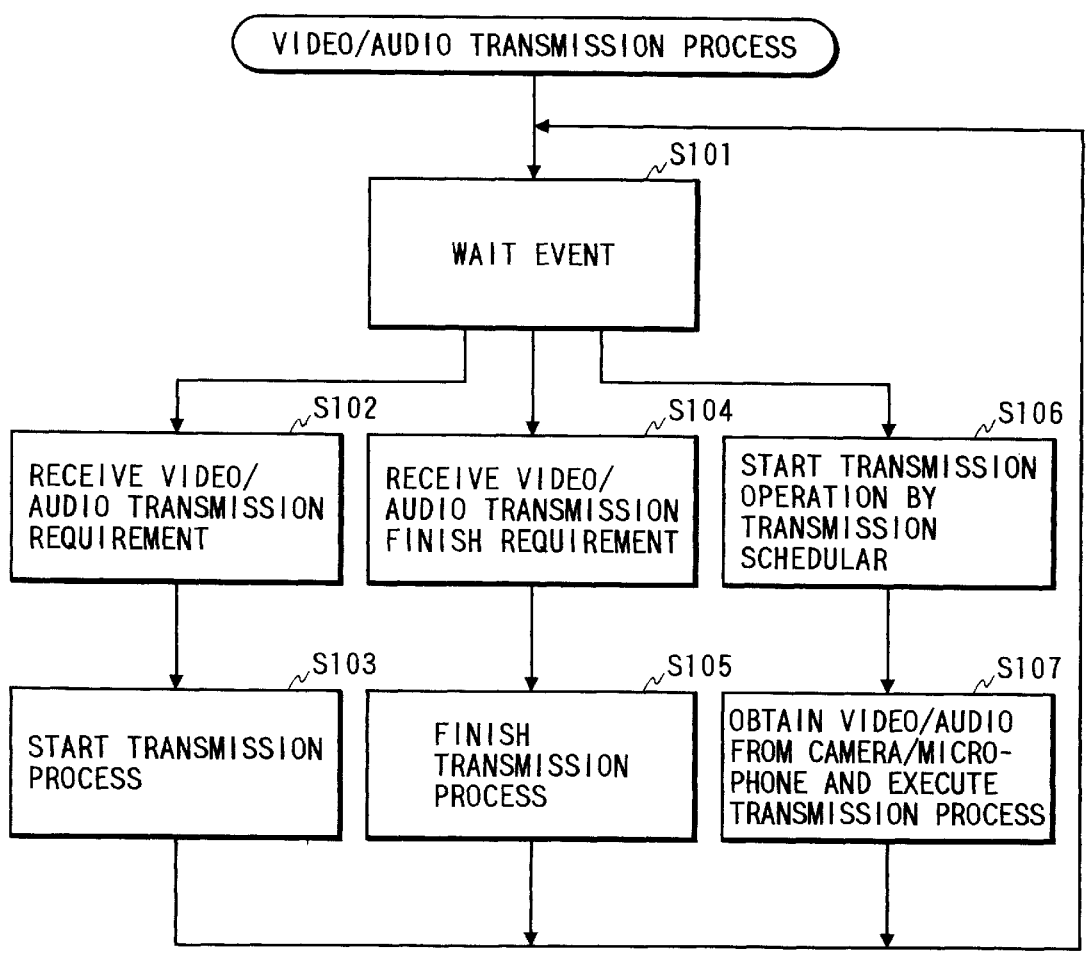
FIG. 16 is a flow chart showing the function of the embodiment shown in FIG. 13.

FIG. 16 is a flow chart showing the function of the embodiment shown in FIG. 13. At first there is entered a state for awaiting an event such as a transmission request, a transmission finishing request or a transmission start request (S101). When a video/audio transmission request is received (S102), there is started a new transmission process (S103). When a video/audio transmission finishing request is received (S104), the designated video/audio transmission process is finished (S105). Also when there is generated an event for activating the video/audio transmission by the transmission scheduler (S106), there are generated acquisition and transmission of the video/audio signals from the camera/microphone (S107).

Also the present embodiment has an occupying process request and a non-occupying process request. The occupying process request is a transmission request for allowing specified data to occupy all the transmitting operations, thereby enabling data communication with a high frame rate. Such occupying process request is required in case the frame rate requested for the video/audio transmission server 110 exceeds the switching speed of the matrix switch 112. The non-occupying process request is a transmission request for transmitting plural video/audio signals without assigning a high frame rate thereto. There can be accepted plural non-occupying process requests, which are transmitted in succession according to the transmission scheduler, which is in fact realized by a timer event.

Each transmission request is divided into two kinds, one of which is a data transmission request in which priority is given to the image frame rate rather than the resolution, for example for the television conference. In this case, the image range dividing unit 114 is set at the dividing operation mode, and plural images are fetched and encoded without switching by the matrix switch 112. The other is a data transmission request giving priority to the resolution rather than the frame rate, for example for observing the details of an object. In this case the image range dividing unit 114 is set at the selecting operation mode, and the matrix switch 112 selects video/audio signals to be transmitted.

The control circuit 126 at first enters an event awaiting state (S101). When a communication from the exterior or a timer event of the transmission scheduler is generated, the sequence proceeds to a step S102, S104 or S106 according to the content of communication or the kind of the event.

If the received message is a new transmission request, the sequence proceeds to a video/audio transmission request accepting process (S102) to read the content of the message, and a transmission starting process (S103) is executed according to the content of the message.

If the received message is a transmission finishing request, the sequence proceeds to a video/audio transmission request accepting process (S104) to read the content of the message, and a transmission finishing process (S106) is executed according to the content of the message.

If a timer event is generated, the transmission process is re-started, and the sequence returns to the event awaiting state (S101). The started transmission process executes acquisition and transmission of the video/audio signals from camera/microphone and again sets the timer (S107).

Figure 17:
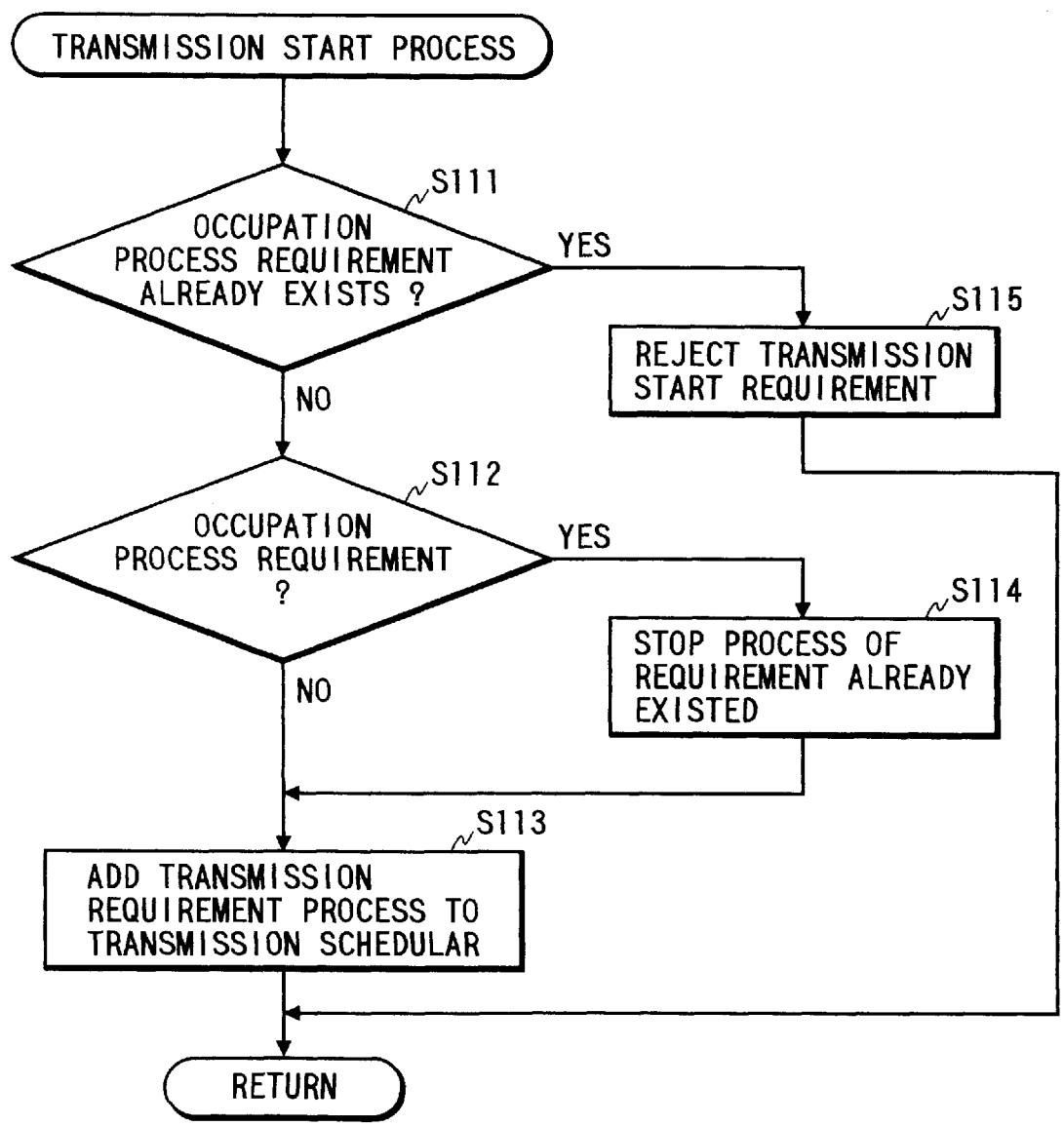
FIG. 17 is a detailed flow chart of a transmission start process in the step S103 in FIG. 16.

FIG. 17 is a detailed flow chart of the transmission starting process (S103) in FIG. 16. The control circuit 126 at first discriminates whether an occupying process request is already present (S111). If present (S111), the process request is inhibited since other requests cannot be accepted (S115). If absent (S111), there is discriminated whether the process to be started is an occupying process request (S112). If it is a non-occupying process request (S112), a transmission request process, according to whether the priority is given to the resolution or to the frame rate, is added to the transmission scheduler and a timer for start is set (S113) whereupon the process is terminated. In case of an occupying process request (S112), which is not compatible with other requests, the process of the already existing requests is temporarily suspended (S114). Then a transmission request process is added to the transmission scheduler and a timer for start is set (S113) whereupon the process is terminated.

Figure 18:
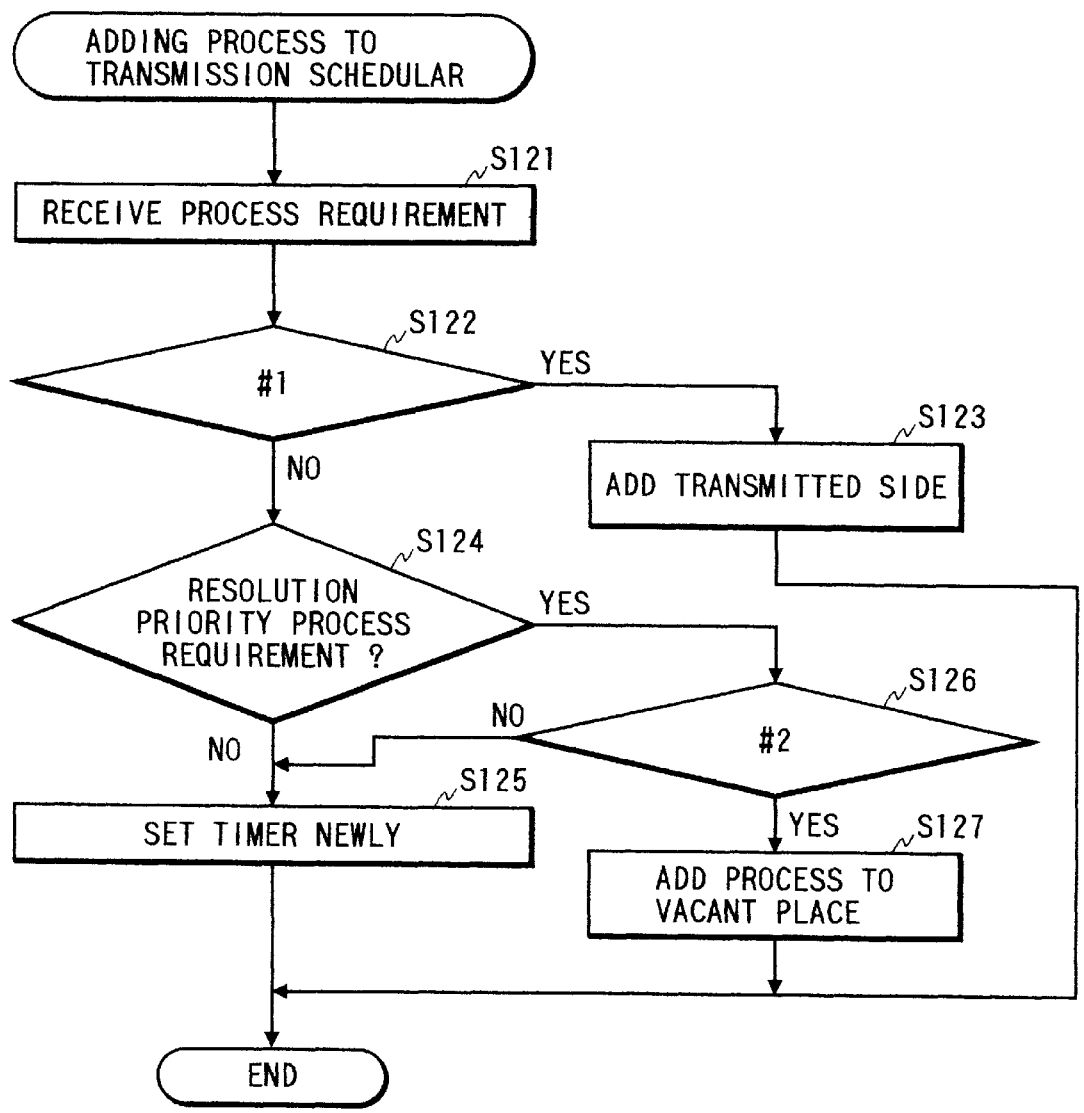
FIG. 18 is a flow chart of a procedure for adding a process in response to a non-occupying process request to the transmission scheduler.

FIG. 18 shows the procedure of adding the process of a non-occupying process request to the transmission scheduler. At first a process request is received (S121), and there is discriminated whether a transmission process request for a camera, same as that requested in the received process request, is already present in the transmission scheduler (S122). If present (S122), the destination of the newly received transmission request is added to the already present transmission process and the sequence is terminated (S123). If absent (S122), there is discriminated whether the priority in the process request received in the step S122 is given to the resolution or to the frame rate (S124). In case of priority in the resolution (S124), there is set a timer for the new start and the sequence is terminated (S125). In case of priority in the frame rate (S124), there is checked, with reference to the transmission scheduler, whether a vacancy is available in the waiting train of the process requests with priority in the frame rate (S126), and, if vacancy is not available (S126), there is set a timer for the new start and the sequence is terminated (S125). If vacancy is available (S126), the process is added to such vacancy and the sequence is terminated (S127).

Through the above-explained procedure, the transmission scheduler realizes a transmission schedule as shown in FIG. 20, in response to a train of transmission request as shown in FIG. 19.

Figure 21:
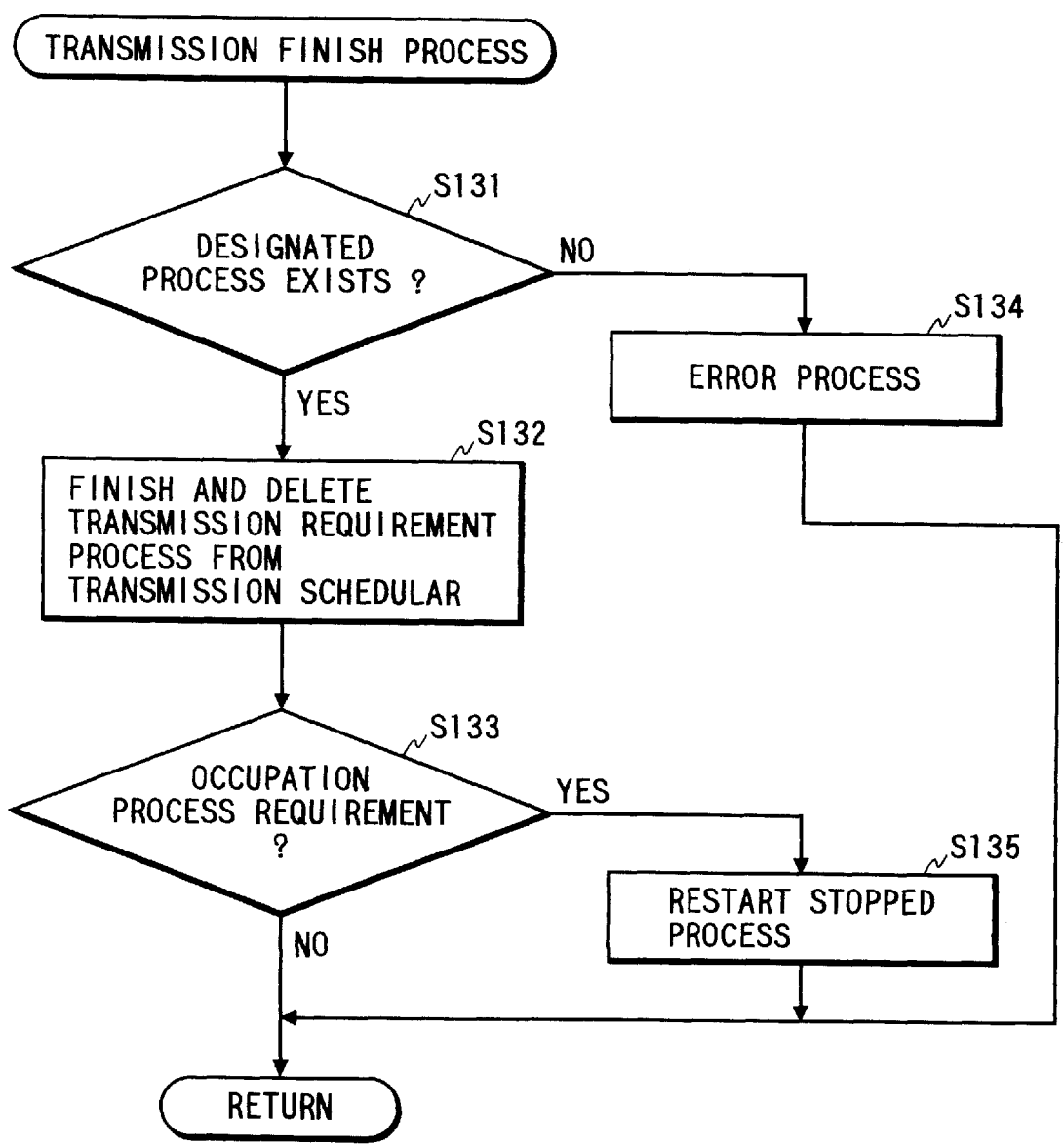
FIG. 21 is a detailed flow chart of a transmission end process in the step S105 in FIG. 16.

FIG. 21 is a detailed flow chart of a transmission finishing process (S105) in FIG. 15. At first the control circuit 126 discriminates whether the designated process to be finished is actually present, by referring to the transmission scheduler (S131). If absent (S131), an error message is returned. If the designated process to be finished is actually present (S131), a finish signal is sent to the corresponding transmission request process, thereby deleting such process from the transmission scheduler (S132). Then there is discriminated whether the finished process is based on an occupying process request (S133), and, if so (S133), the processes temporarily suspended by such occupying process are returned to a restartable state by referring to the transmission scheduler and the process is terminated (S135).

The content of the video/audio data acquisition and the transmission, in the step S107 in FIG. 16, varies depending upon whether the process request is an occupying request.

Figure 22:
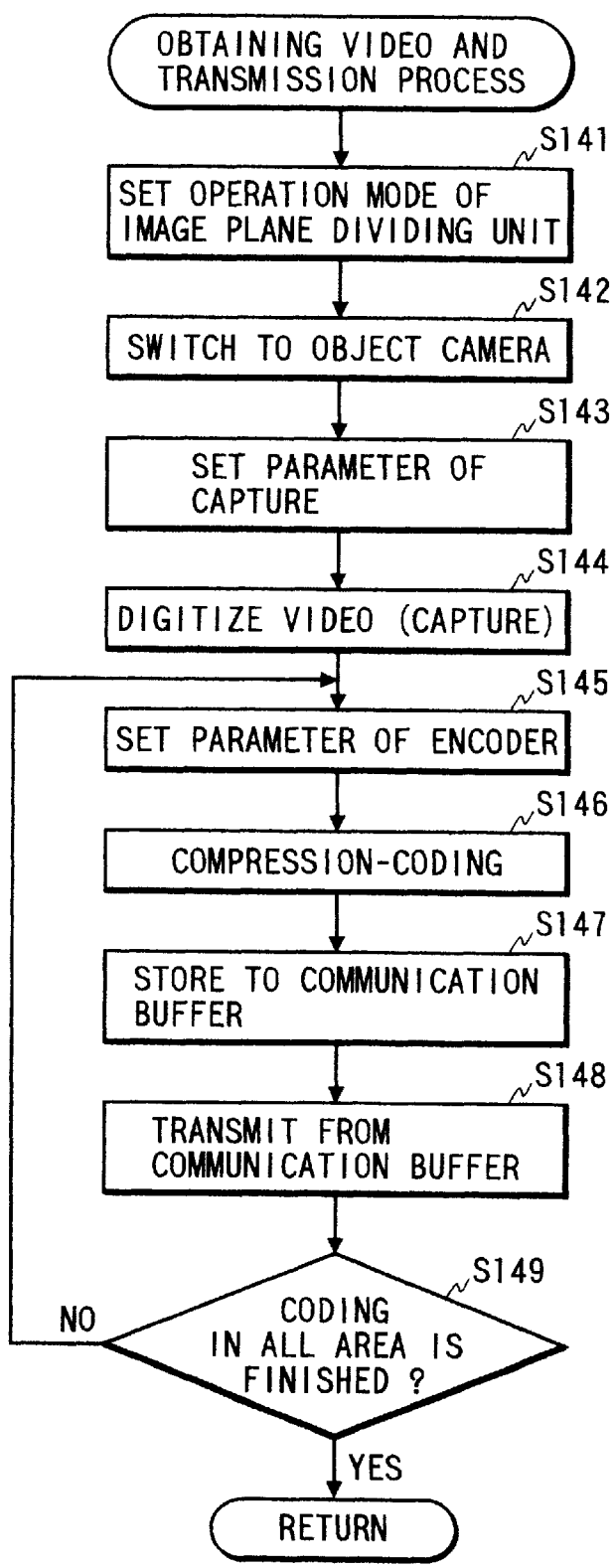
FIG. 22 is a detailed flow chart of a step S107 in FIG. 16 in case of a non-occupying process request.

FIG. 22 is a detailed flow chart of the step S107 in FIG. 16, in case of a non-occupying process request. At first the control circuit 126 sets the operation mode of the image range dividing unit 114 at the selecting mode or the dividing mode, respectively if the priority of the request is given-to the resolution or to the frame rate (S141). Then the matrix switch 112 is so set as to fetch the video/audio signals of the requested camera/microphone (S142), and the parameters of the video capture device 116 and the audio capture device 120 so as to obtain the requested image size and audio quality (S143). The video capture device 116 and the audio capture device 120 fetch and digitize the video/audio data (S144).

Then the compression encoding parameters (encoding method, compression rate etc. and the encoding range) are set in the video encoder 118 and the audio encoder 122 (S145), and the outputs of the capture devices 116, 120 are compression encoded under these conditions (S146). The encoding range in the compression encoding conditions is, for example, the entire image area in case the priority is given to the resolution in the transmission request and one of the uncoded areas within the image area divided by the image range dividing unit 114 in case the priority is given to the frame rate. The encoded video/audio data are temporarily stored in the communication buffer 124 (S147), and are transmitted therefrom to the requesting terminal (or a designated partner) through the network. After the transmission, a next transmission request process is added to the transmission scheduler. The steps S145 to S148 are repeated until all the captured areas are transmitted (S149).

Since the encoding parameters are set for each input and for each divided area (S145), the areas can be encoded with respectively different encoding methods. Also if the encoders 118, 122 have plural compression encoding methods, the encoding method may be changed for each input.

Figure 23:
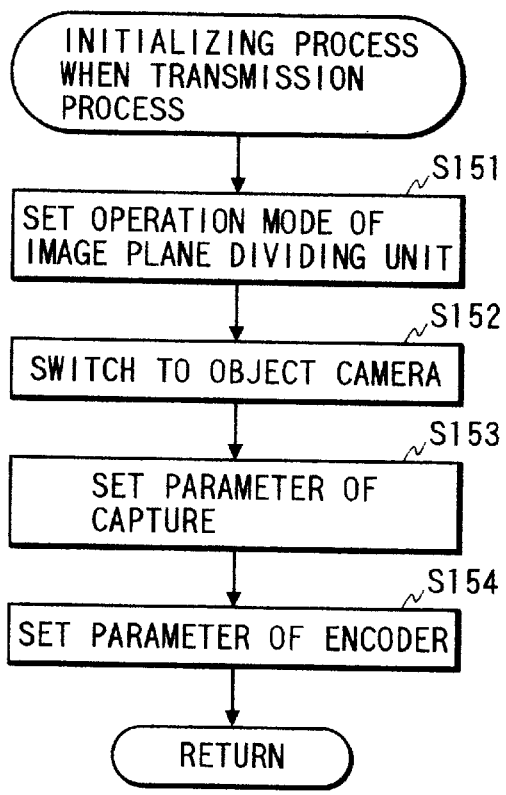
FIG. 23 is a flow chart of an initialization process in a step S107 in FIG. 16 in case of an occupying process request.
Figure 24:
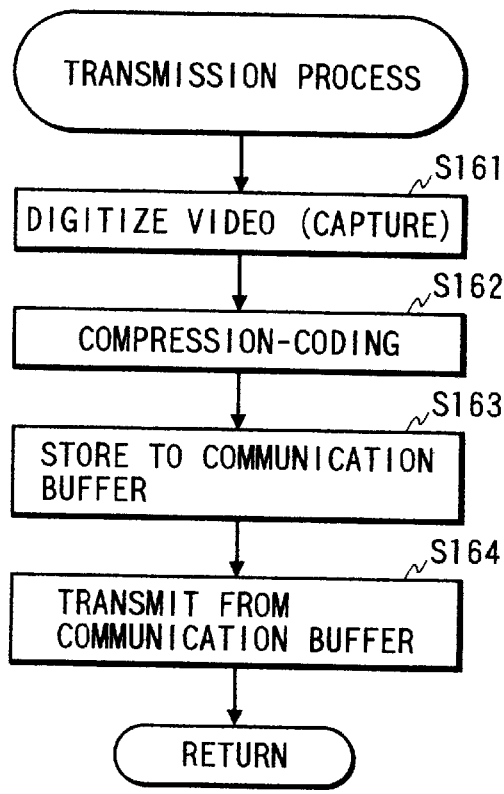
FIG. 24 is a flow chart of a data transmission process in a step S107 in FIG. 16 in case of an occupying process request.

FIGS. 23 and 24 show the details of the step S107 in FIG. 16, in case of an occupying process request. FIG. 23 shows an initialization process, while FIG. 24 shows the process of acquisition of the video/audio data from the camera/microphone and of transmission. In case of the occupying process request, an initialization process corresponding to steps S141 to S143 and S145 in FIG. 22 is executed only at first (and at the change of the transmission request parameters), and the data acquisition and the transmitting operation alone are repeated thereafter.

Now referring to FIG. 23, the image range dividing unit 114 is set at the selecting mode (S151) thereby enabling high-speed transmission of the signal from a specified camera. Then the matrix switch 112 is so set as to enter the video/audio signal from the requested camera/microphone (S152). The parameters matching the content of the transmission request are set in the video capture device 116 and the audio capture device 120 (S153), and also in the video encoder 118 and the audio encoder 122 (S154). If the image range dividing unit 114 is set at the dividing mode in the step S151, there can be achieved high-speed transmission of the video signals from plural cameras (four cameras at maximum in the configuration shown in FIGS. 14A and 14B).

Now referring to FIG. 24, the video capture device 116 and the audio capture device 120 respectively digitize the video signal and the audio signal from the image range dividing unit 114 (S161). Then the video encoder 118 and the audio encoder 122 respectively execute compression encoding of the output data of the video capture device 116 and the audio capture device 120 (S162), and store the encoded data in the communication buffer 124 (S163). The data stored therein are transmitted, with the predetermined rate and format, to the transmission requesting terminal (or a designated partner) through the network (S164). After the transmission, the timer is set at the timing of next transmission, and the sequence is terminated.

In the transmission process shown in FIGS. 22 and 24, it is also possible to improve the efficiency of data transmission by forming the steps of encoding of the video/audio data and storage in the communication buffer 124 (S145–S147 and S161–S163) and the steps of transmission of the data stored in the communication buffer 124 (S148 and S164) into separate processes, and preparing two buffers whereby the transmission process executing the step S148 or S164 transfer the data of a buffer while the encoding process stores the data, to be transmitted next, in the other buffer thereby simultaneously executing the writing and the reading of the communication buffer.

Figure 25:
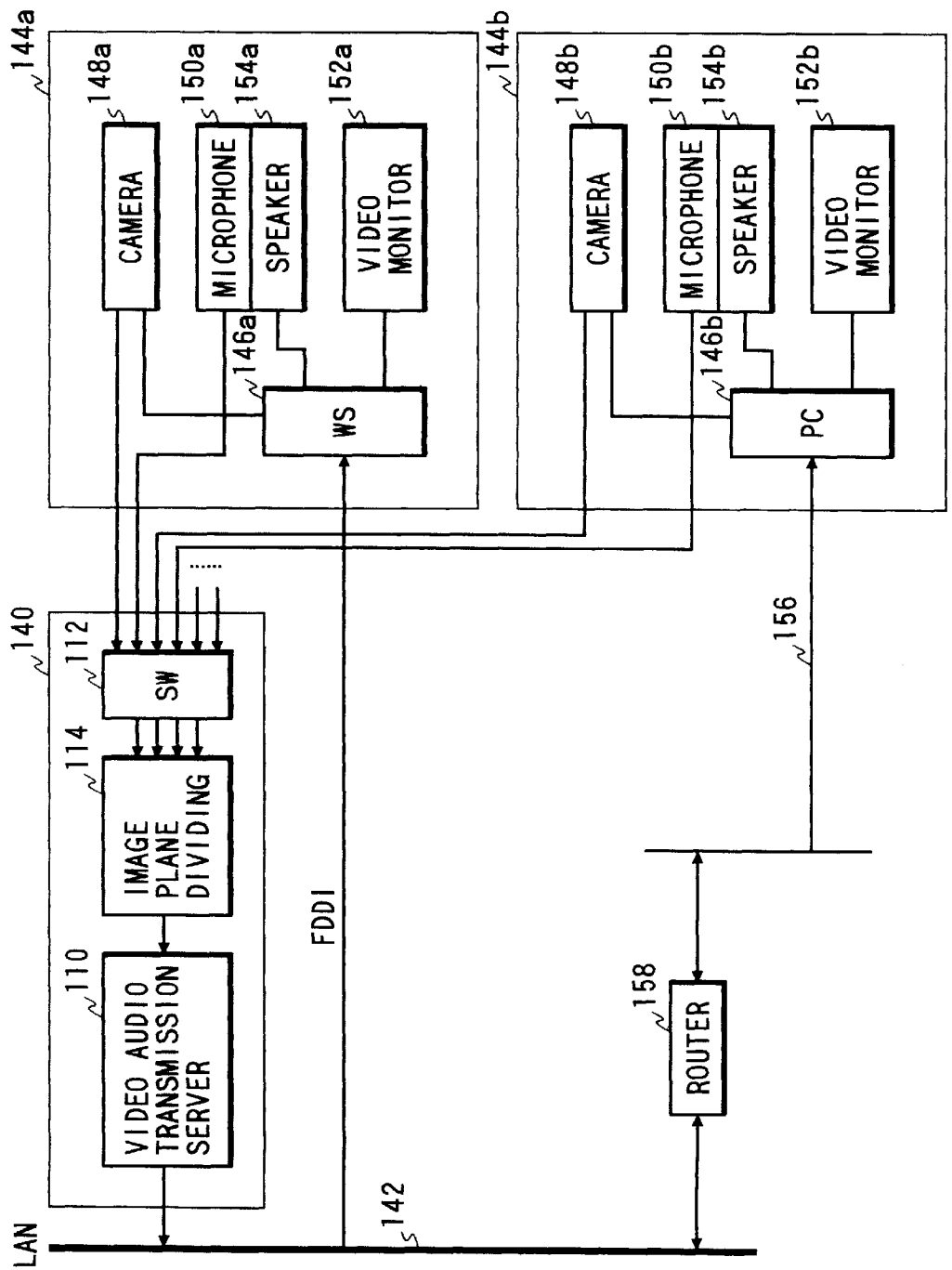
FIG. 25 is a schematic block diagram of a television conference system utilizing the embodiment shown in FIG. 13.

FIG. 25 is a schematic view showing the network configuration of a television conference system utilizing the embodiment shown in FIG. 13. A video/audio transmission apparatus 140 is composed of the video/audio transmission server 110, the matrix switch 112 and the image range dividing unit 114 and is connected to a communication network 142 such as a local area network (LAN), a wide area network (WAN), a public telephone network or other networks.

The matrix switch 112 of the video/audio transmission apparatus 140 receives the outputs of the cameras and the microphones of two terminal 144a, 144b placed on or at the side of personal desks. The terminal 144a is constructed on a work station 146a while the terminal 144b is constructed on a personal computer 146b, and are respectively connected to cameras 148a, 148b, microphones 150a, 150b, video monitors 152a, 152b, and speakers 154a, 154b. The microphones 150a, 150b and speakers 154a, 154b are for example constructed as speaker-phones.

As an example the terminal 144a is connected to the network 142 through a high-speed network such as FDDI, and the work station 146a is for example equipped with a hardware for decoding the encoded video/audio signals. The terminal 142b is connected to the network 142 through an ethernet 156 and a router 158, and the computer 146b is provided with a software for decoding the encoded video/audio signals. The network 142 to which the output of the video/audio transmission apparatus 140 is connected is a basic network or a similar high-speed network.

In the following there will be explained how the television conference is conducted under the above-explained environment. It is assumed that the television conference is conducted between the terminal 144a and another unrepresented terminal.

In the television conference, the image of the participant himself and that of the communication partner (or plural partners) are displayed on the monitor, and the voice of the partner is released from the speaker of the terminal of the participant. In case the terminal 144a is used as the participant's terminal (self side), the above-mentioned functions can be achieved by activating the video reception process of the self terminal and activating the video and audio reception processes of the partner terminal.

Since the video reception process of the self terminal and the video and audio reception processes of the partner terminal are mutually similar, there will be explained, as an example, the video and audio reception processes of the partner terminal in the following.

Figure 26:
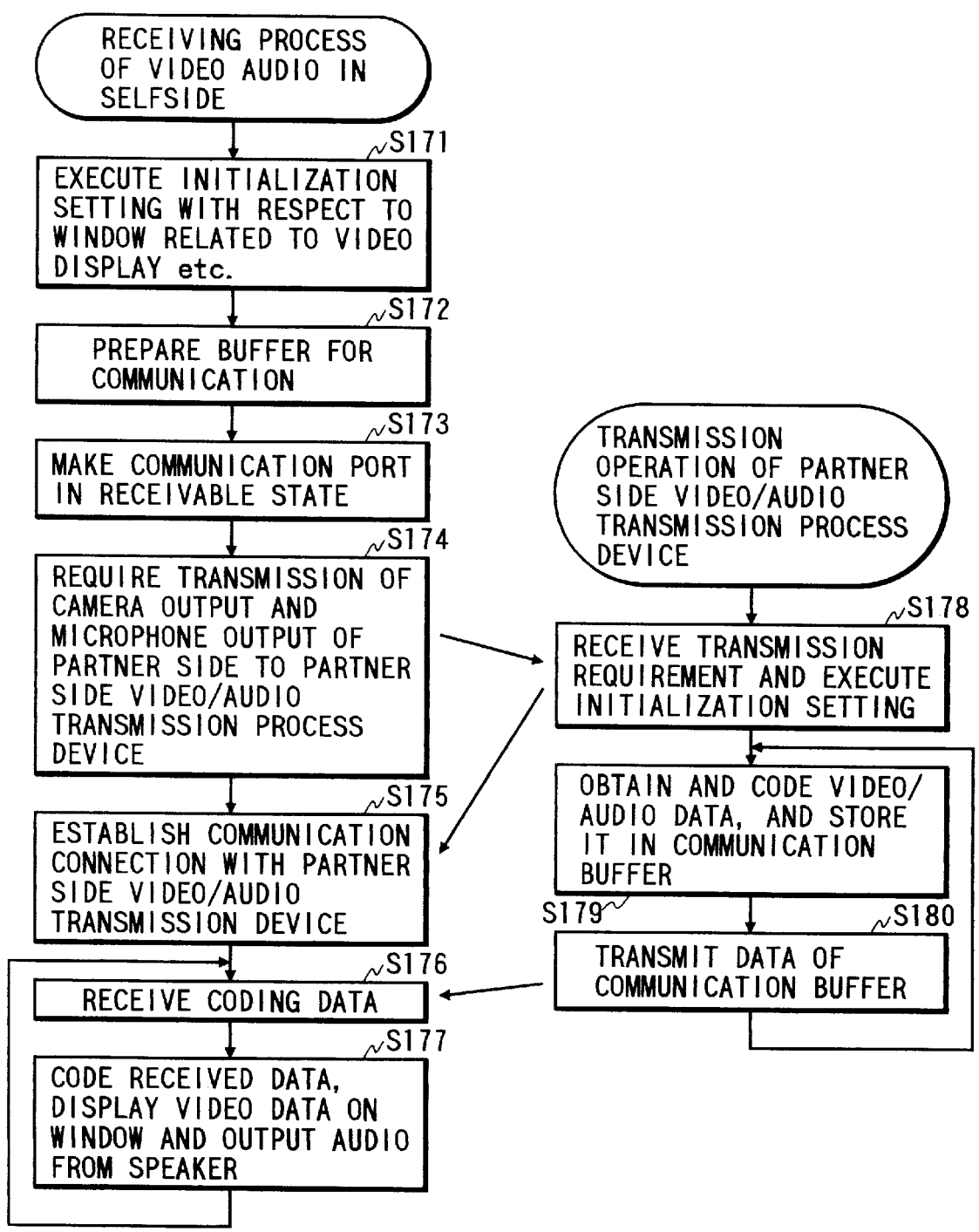
FIG. 26 is a flow chart of a video/audio transmission process of a partner video/audio transmission process apparatus and a video/audio reception process of a terminal of the self side in the embodiment shown in FIG. 13.

FIG. 26 shows the relationship of the video/audio reception process functioning on the self terminal and the data transmission process of the video/audio transmission apparatus receiving the camera output and the microphone output of the partner side (hereinafter called partner video/audio transmission apparatus), wherein steps S171–S177 indicate the video/audio reception process functioning on the self terminal, and steps S178–S180 indicate the data transmission process of the partner video/audio transmission apparatus.

At first the reception process is activated on the self terminal. There are initialized modules on a window system required for the video display and the audio output (S171), and there is prepared a buffer for data reception (S172). Then opened is a port for reception, thereby enabling the acceptance of reception (S173). Then requested, to the partner video/audio transmission apparatus, is the transmission of the camera output and the microphone output of the partner terminal (S174). In response to this request, the partner video/audio transmission apparatus, if capable of accepting the request, executes initialization for the transmission and requests the communication connection to the reception port of the terminal 144a (S178). Thus the self terminal (144a) establishes the communication connection with the partner video/audio transmission apparatus (S175).

The partner video/audio transmission apparatus acquires and encodes the audio and video data, stores them in the communication buffer (S179) and transmits the data, stored in the communication buffer, to the communication partner (terminal 144a) (S180).

The self terminal 144a receives the encoded data (S176), then decodes the encoded data to display an image in a window of the video monitor 152a and releases a voice from the speaker 154a (S177).

Thereafter the partner video/audio transmission apparatus repeats the steps S179 and S180, while the terminal 144a repeats the steps S176 and S177. Thus the image and the voice are continuously transferred and reproduced.

The outputs of the camera and the microphone may be branched in the stage of analog signals and supplied both to the computers 146a, 146b and to the video/audio transmission apparatus 140. In such case it is no longer necessary to receive the image of the self side, but a video capturing function for digitizing the output from the camera has to be provided in the computers 146a, 146b.

Also the wirings can be dispensed with by wireless transmission of the outputs of the cameras 146a, 146b and the microphones 150a, 150b to the video/audio transmission apparatus 140.

The above-explained configuration allows to arbitrarily select and transmit the video/audio information from plural sources consisting of cameras and microphones, not exceeding four in number.

Figure 27:
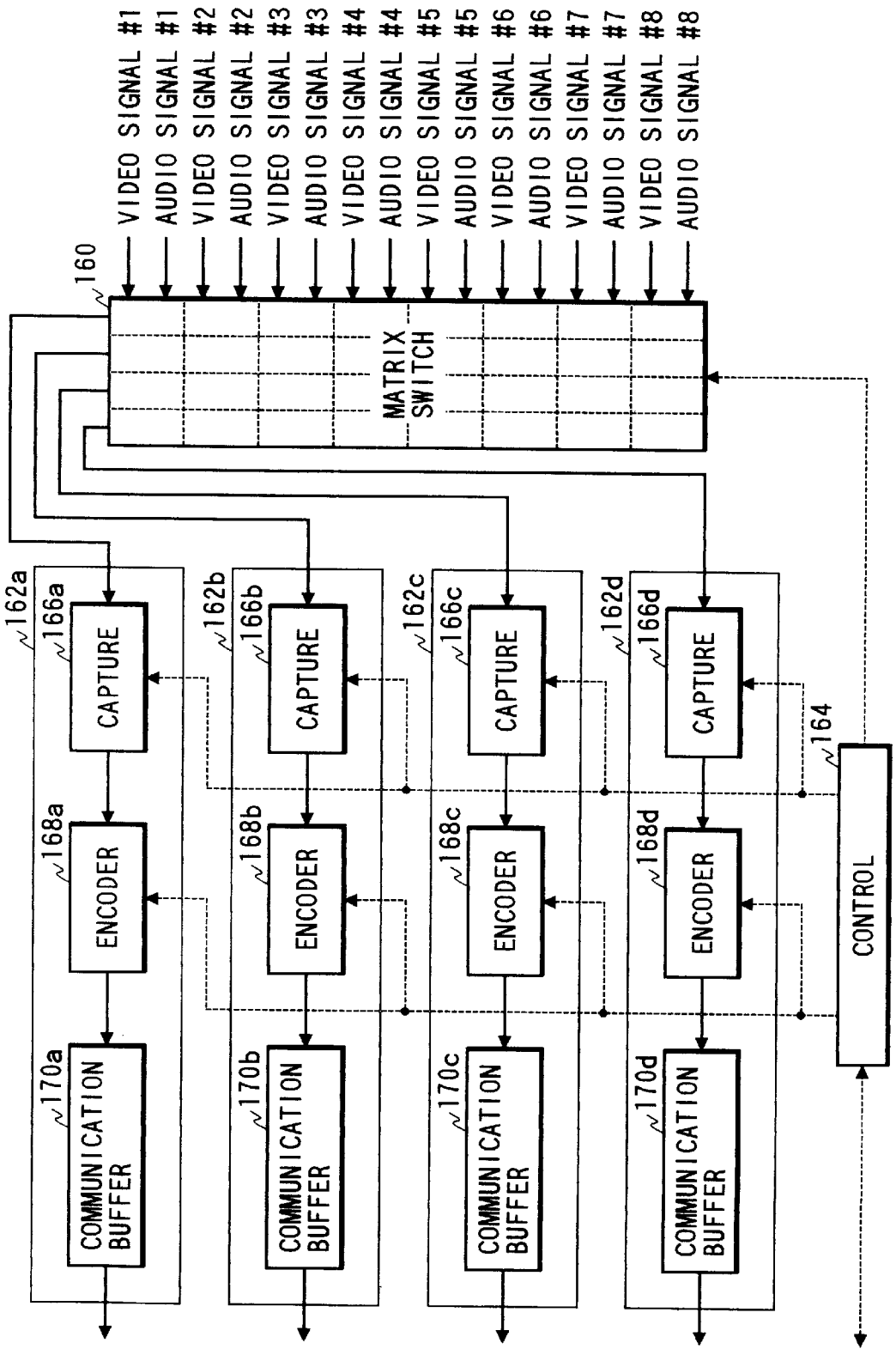
FIG. 27 is a schematic block diagram of a second embodiment of the present invention employing a matrix switch.

FIG. 27 is a schematic block diagram of a variation of the embodiment shown in FIG. 13, wherein shown are an 8-input 4-output matrix switch 160 similar to the matrix switch 112, video/audio transmission servers 162a, 162b, 162c, 162d for fetching and encoding the four video/audio output signals from the matrix switch 160, for transmission to the network, and a control device 164 for controlling the video/audio transmission servers 162a–162d and the matrix switch 160 according to control signals from the exterior.

The video/audio transmission servers 162a–162d are composed of capture devices 166a–166d for fetching the video/audio output signals of the matrix switch 160; encoders 168a–168d for compression encoding the outputs of the capture devices 166a–166d; and communication buffers 170a–170d for temporarily storing the outputs of the encoders 168a–168d for transmission to the network.

Each of the video/audio transmission servers 162a–162d effects fetching and encoding of the output from the matrix switch 160 and transmits the encoded data to the network, independently from other servers. Consequently each video/audio information can be transmitted with a high quality. In applications requiring the signal of a high frame rate and a high resolution among multiple locations, the use of plural encoders as in the present embodiment allows to dispers the load while improving the cost effectiveness in comparison with the case of providing each terminal with a capture device and an encoder, thereby enabling simultaneous transmission of plural signals.

In the embodiment shown in FIG. 27, the allocation of a transmission request to the plural video/audio transmission servers 162a–162d is determined in the following manner. The side issuing the transmission request (receiving side) refers to the transmission schedulers of the video/audio transmission servers 162a–162d through the control device 164 of the video/audio transmission apparatus of the side receiving the transmission request (namely transmitting side). Based on the result of such reference, the receiving side determines one of the video/audio transmission servers 162a–162d to which the transmission is to be requested, and sends the transmission request with the designation of one of the video/audio transmission servers 162a–162d through the control device 164.

There may also be conceived a configuration which, in case the receiving side sends the transmission request to the control device 164 of the transmitting side without such designation, the control device 164 of the transmitting side automatically assigns the process to suitable one of the video/audio transmission servers 162a–162d according to the load or ability thereof, by referring to the transmission schedules of the servers 162a–162d. Such configuration provides an advantage that the receiving side is relieved from the burden of referring to the transmission schedulers and designation of the video/audio transmission server.

Once the assignment of the transmission requests to the video/audio transmission servers 162a–162d in either configuration, the assigned transmission processes are added to the transmission scheduler of each of the video/audio transmission servers 162a–162d. The control device 164 suitably sets the matrix switch 164 by referring to the transmission schedulers of the video/audio transmission servers 162a–162d. The video/audio transmission servers 162a–162d fetch the outputs of thus set matrix switch 160, and effect compression encoding for transmission to the network.

Figure 28:
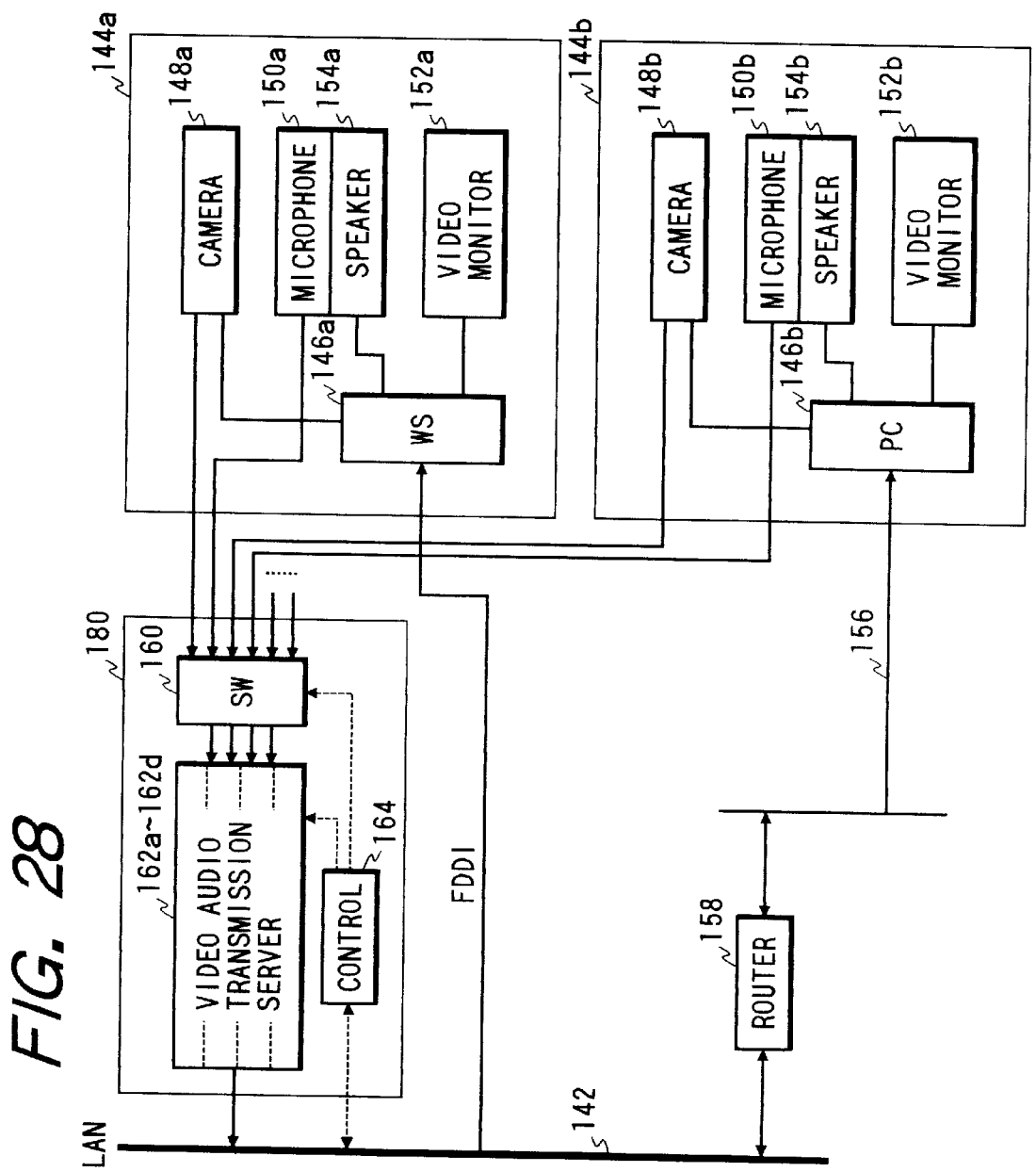
FIG. 28 is a schematic block diagram of a television conference system employing the embodiment shown in FIG. 27.

FIG. 28 is a schematic block diagram of a television conference system utilizing the video/audio transmission apparatus shown in FIG. 27, wherein 180 indicates the video/audio transmission apparatus shown in FIG. 27. In FIG. 28, components same as those in FIG. 25 are represented by same numbers. Such configuration enables simultaneous digitization and compression encoding of plural signals without sacrificing the cost effectiveness through dispersion of the loads.

The present invention is applicable not only to a system consisting of plural equipment (such as a host computer, interface equipment, readers and/or printers) but also to an apparatus consisting of a single equipment (such as a copying machine or a facsimile apparatus).

The technical aspect of the present invention also includes a configuration of providing a computer in an apparatus or a system, which is so connected with various devices as to operate such devices to realize the functions of the aforementioned embodiments, with program codes of a software for realizing the functions of the aforementioned embodiments whereby the computer (CPU or MPU) of such apparatus or system operate such devices according to the stored program. In such case, the program codes themselves of the above-mentioned software correspond to the realization of the functions of the aforementioned embodiments, and the program codes themselves, and means for supplying the computer with such program codes, for example a memory medium storing such program codes, constitute the present invention.

The memory medium storing such program codes can be, for example, a floppy disk, a hard disk, an optical disk, a magnetooptical disk, a CD-ROM, a magnetic tape, a non-volatile memory card or a ROM.

Also the embodiments of the present invention naturally include not only the case of realizing the functions of the aforementioned embodiments by the execution of the supplied program codes by the computer but also a case where the functions of the aforementioned embodiments are attained by the cooperation of such program codes with the operating system or another application software functioning on the computer.

Furthermore the present invention includes a case where the supplied program codes are stored in a memory provided in a function expanding board of the computer or in a function expanding unit connected to the computer and a CPU or the like provided in such function expanding board or unit executes the actual process or a part thereof under the instruction of the program codes thereby realizing the functions of the aforementioned embodiments.

As will be easily understood from the foregoing, the embodiments of the present invention allows to commonly utilizing the video/audio information transmitting resource by plural terminals, thereby elevating the working rate of such resource and improving the cost effectiveness.

Also the video/audio information can be transmitted with an appropriate quality matching the ability or status of the destination, by providing plural compression encoding means and selecting such compression encoding means based on the information exchange with the communication partner and/or on the status of the communication path.

Also such embodiments can be incorporated in the television conference system thereby enabling construction thereof with a lower cost. Also the terminals for the television conference system can be made cheaper, by concentrating the video/audio encoding means.

Also the embodiments of the present invention enables common use of the capture device and the encoder by the use of a switch for selecting arbitrary plural signals from the plural input signals, and allows to improve the working rate of these modules thereby improving the cost effectiveness. Furthermore, the simultaneous digitization and compression encoding of the plural input signals allow to reduce the time loss resulting from the switching operation of the switch.

Also the embodiments of the present invention enables transmission of the information with an appropriate quality matching the ability and status of the destination, as the compression encoding means is selected according to the information exchange with the destination and the status of the communication path.

What is claimed is:

1. A transmission processing apparatus for selecting a desired input from plural inputs for at least one of a video and an audio and transmitting the selected input to a network, comprising:

selection means for selecting plural analog input signals according to a request from a transmission destination;

A/D conversion means for digitizing the analog input signal output from said selection means;

encoding means for compression-encoding the digital output of said A/D conversion means;

control means for controlling so as to transmit the signals selected by said selection means to plural transmission destinations in parallel according to said request; and output means for outputting, via said network, the digital output encoded by said encoding means, according to the control by said control means.

2. A transmission processing apparatus according to claim 1, wherein said encoding means includes plural compression encoding means, and further comprising control means for selecting compression-encoding means to be used, based on a kind of the transmission destination or a network path.

3. A transmission processing apparatus according to claim 1, wherein said encoding means includes video encoding means and audio encoding means.

4. A transmission processing apparatus according to claim 1, further comprising generating means for generating a transmission schedule according to said request from said transmission destination.

5. A transmission processing apparatus according to claim 1, wherein said control means includes change-over means for changing over between an occupation mode of transmitting the signals according to the request of one transmission destination and an un-occupation mode of accepting requests from the plural transmission destinations at once to transmit the signals according to those requests.

6. A transmission processing apparatus for selecting a desired input from plural inputs for at least one of a video and an audio and transmitting the selected input to a network, comprising:

selection means for selecting plural inputs supplied through the network according to a request from a transmission destination;

encoding means for compression-encoding a signal from said selection means;

control means for controlling so as to transmit the inputs selected by said selecting means to plural transmission destinations in parallel according to said request; and output means for outputting, via said network, the signal encoded by the encoding means, according to the control by said control means.

7. A television conference system for holding a television conference among plural communication terminals by communication of a video and an audio, comprising at least a transmission processing apparatus according to claim 6, wherein the video of a camera and the audio of a microphone relating to at least a communication terminal are connected to a predetermined transmission processing apparatus and wherein at least a transmission processing apparatus is only provided with decoding means for decoding encoded video information and encoded audio information.

8. A television conference system according to claim 7, wherein said encoding means includes video encoding means and audio encoding means.

9. A television conference system according to claim 7, wherein said network is a local area network.

10. A transmission processing apparatus according to claim 6, wherein said control means includes change-over means for changing over between an occupation mode of transmitting the input according to the request of one transmission destination and an un-occupation mode of accepting requests from the plural transmission destinations at once to transmit the input according to those requests.

11. A television conference system comprising:

selection means for selecting a desired input from plural input for at least one of a video and an audio, according to a request from a transmission destination;

encoding means for compression-encoding the input selected by said selection means;

control means for controlling so as to transmit the input selected by said selection means to plural transmission destinations in parallel according to said request; and transmission means for transmitting, via a network, the input encoded by said encoding means, according to the control by said control means.

12. A television conference system according to claim 11, wherein said encoding means include video encoding means and audio encoding means.

13. A television conference system according to claim 11, wherein said control means includes change-over means for changing over between an occupation mode of transmitting the input according to the request of one transmission destination and an un-occupation mode of accepting requests from the plural transmission destinations at once to transmit the input according to those requests.

14. A transmission processing method for selecting at least one of inputs from plural inputs for at least one of a video and an audio and transmitting the selected input to a network, comprising steps of:

selecting plural analog input signals according to a request from a transmission destination;

digitizing the selected analog signal by A/D conversion means;

compression-encoding a digital output generated in said digitizing step;

controlling so as to transmit the selected signals to plural transmission destinations in parallel according to said request; and outputting, via said network, the encoded digital output, according to the control by said controlling step.

15. A transmission processing method according to claim 14, further comprising a step of selecting a compression-encoding method to be used, from plural compression-encoding methods based on a kind of the transmission destination or a network path.

16. A transmission processing method according to claim 14, wherein said controlling step includes changing over between an occupation mode of transmitting the signals according to the request of one transmission destination and an un-occupation mode of accepting requests from the plural transmission destinations at once to transmit the signals according to those requests.

17. A transmission processing method for selecting an input from plural inputs for at least one of a video and an audio and transmitting the selected input to a network, comprising steps of:

selecting plural inputs supplied through the network according to a request from a transmission destination;

compression-encoding the selected input;

controlling so as to transmit the selected inputs to plural transmission destinations in parallel according to said request; and outputting an output encoded in said compression-encoding step, according to the control by said controlling step.

18. A transmission processing method according to claim 17, wherein said controlling step includes changing over between an occupation mode of transmitting the input according to the request of one transmission destination and an un-occupation mode of accepting requests from the plural transmission destinations at once to transmit the input according to those requests.

19. A memory medium readable by a computer, comprising:

first code means for selecting one of plural kinds of analog signals according to a request from a transmission destination;

second code means for converting analog signal selected by said first code means into digital signal;

third code means for compressing the digital signal; and fourth code means for controlling so as to transmit the signals selected by said first code means to plural transmission destinations in parallel according to said request.

20. A memory medium readable by a computer according to claim 19, wherein said fourth code means includes code means for changing over between an occupation mode of transmitting the signals according to the request of one transmission destination and an un-occupation mode of accepting requests from the plural transmission destinations at once to transmit the signals according to those requests.

21. A transmission processing apparatus for transmitting a selected input to a network, comprising:

selection means for selecting plural input signals according to a request from a transmission destination;

control means for controlling so as to transmit the signals selected by said selection means to plural transmission destinations in parallel according to said request, wherein said control means includes change-over means for changing over between an occupation mode of transmitting the signals according to the request of one transmission destination and an un-occupation mode of accepting requests from the plural transmission destinations at once to transmit the signals according to those requests; and output means for outputting the data to the plural transmission destinations via said network according to the control by said control means.

22. A transmission processing apparatus for transmitting a selected input to a network, comprising:

selection means for selecting plural input signals according to a request from a transmission destination;

control means for controlling so as to transmit the signals selected by said selection means to plural transmission destinations in parallel according to said request;

encoding means including plural compression encoding means, wherein said control means selects the compression encoding means to be used, based on a kind of the transmission destination or a network path; and output means for outputting the data to the plural transmission destinations via said network according to the control by said control means.

23. A transmission processing apparatus for transmitting a selected input to a network, comprising:

selection means for selecting plural input signals according to a request from a transmission destination;

control means for controlling so as to transmit the signals selected by said selection means to plural transmission destinations in parallel according to said request;

encoding means including plural compression encoding means, wherein said control means selects the compression encoding means to be used, based on a kind of the transmission destination or a network path and wherein said encoding means includes video encoding means and audio encoding means; and output means for outputting the data to the plural transmission destinations via said network according to the control by said control means.

24. A method for transmitting a selected input to a network for a transmission processing apparatus, comprising the steps of:

selecting plural input signals according to a request from a transmission destination;

controlling so as to transmit the signals selected by said selecting to plural transmission destinations in parallel according to said request, wherein said controlling includes changing over between an occupation mode of transmitting the signals according to the request of one transmission destination and an un-occupation mode of accepting requests from the plural transmission destinations at once to transmit the signals according to those requests; and outputting the data to the plural transmission destinations via said network according to the control by said controlling.

25. A method for transmitting a selected input to a network for a transmission processing apparatus, comprising the steps of:

selecting plural input signals according to a request from a transmission destination;

controlling so as to transmit the signals selected by said selecting to plural transmission destinations in parallel according to said request;

encoding including plural compression encoding, wherein said controlling selects the compression encoding to be used, based on a kind of the transmission destination or a network path; and outputting the data to the plural transmission destinations via said network according to the control by said controlling.

26. A method for transmitting a selected input to a network for a transmission processing apparatus, comprising the steps of:

selecting plural input signals according to a request from a transmission destination;

controlling so as to transmit the signals selected by said selecting to plural transmission destinations in parallel according to said request;

encoding including plural compression encoding, wherein said controlling selects the compression encoding to be used, based on a kind of the transmission destination or a network path and wherein the encoding includes video encoding and audio encoding; and outputting the data to the plural transmission destinations via said network according to the control by said controlling.

27. A computer readable program containing executable instructions that when executed, cause a computer to control a transmission processing apparatus to perform:

a selecting step of selecting plural input signals according to a request from a transmission destination;

a controlling step of controlling so as to transmit the signals selected by said selecting to plural transmission destinations in parallel according to said request, wherein said controlling step includes a changing over step of changing over between an occupation mode of transmitting the signals according to the request of one transmission destination and an un-occupation mode of accepting requests from the plural transmission destinations at once to transmit the signals according to those requests; and an outputting step of outputting the data to the plural transmission destinations via said network according to the control by said controlling.

28. A computer readable program containing executable instructions that when executed, cause a computer to control a transmission processing apparatus to perform:

a selecting step of selecting plural input signals according to a request from a transmission destination;

a controlling step of controlling so as to transmit the signals selected by said selecting to plural transmission destinations in parallel according to said request;

an encoding step of encoding including plural compression encoding step of plural compression encoding, wherein said controlling step of controlling selects the compression encoding step to be used, based on a kind of the transmission destination or a network path; and an outputting step of outputting the data to the plural transmission destinations via said network according to the control by said controlling.

29. A computer readable program containing executable instructions that when executed, cause a computer to control a transmission processing apparatus to perform:

a selecting step of selecting plural input signals according to a request from a transmission destination;

a controlling step of controlling so as to transmit the signals selected by said selecting to plural transmission destinations in parallel according to said request;

an encoding step of encoding including plural compression encoding step of plural compression encoding, wherein said controlling step of controlling selects the compression encoding step to be used, based on a kind of the transmission destination or a network path and wherein the encoding step of encoding includes video encoding step and audio encoding step; and an outputting step of outputting the data to the plural transmission destinations via said network according to the control by said controlling.

* * * * *

UNITED STATES PATENT AND TRADEMARK OFFICE
CERTIFICATE OF CORRECTION

PATENT NO. : 6,249,324 B1
DATED : June 19, 2001
INVENTOR(S) : Hiroaki Sato et al.

It is certified that error appears in the above-identified patent and that said Letters Patent is hereby corrected as shown below:

<u>Title page,</u>
Item [57], ABSTRACT, line 1, delete "There is disclosed a" and insert therefor -- A --
Line 1, delete "dispensing with" and insert therefor -- dispensing a signal through --

Signed and Sealed this

Seventh Day of May, 2002

Attest:

JAMES E. ROGAN
*Attesting Officer*  *Director of the United States Patent and Trademark Office*